(12) United States Patent  
Meschter

(10) Patent No.: US 8,070,903 B1  
(45) Date of Patent: Dec. 6, 2011

(54) MOLDED FABRIC AND METHODS OF MANUFACTURE

(76) Inventor: John E Meschter, New York City, NY (US)

(*) Notice: Subject to any disclaimer, the term of this patent is extended or adjusted under 35 U.S.C. 154(b) by 1259 days.

(21) Appl. No.: 11/728,057

(22) Filed: Mar. 23, 2007

Related U.S. Application Data

(60) Provisional application No. 60/786,506, filed on Mar. 28, 2006.

(51) Int. Cl.
*B32B 27/04* (2006.01)

(52) U.S. Cl. ............................. 156/242; 428/57; 428/58

(58) Field of Classification Search .................. 442/357, 442/337, 410; 156/242; 428/57, 58
See application file for complete search history.

(56) References Cited

U.S. PATENT DOCUMENTS

| | | | |
|---|---|---|---|
| 2,276,608 A | | 3/1942 | Bugge |
| 3,419,456 A | | 12/1968 | Tenney |
| 4,195,112 A | * | 3/1980 | Sheard et al. .................. 442/415 |
| 4,241,123 A | * | 12/1980 | Shih .............................. 428/105 |
| 5,490,602 A | * | 2/1996 | Wilson et al. .................... 216/56 |
| 6,967,178 B2 | * | 11/2005 | Zhou et al. ..................... 442/149 |
| 2003/0220041 A1 | * | 11/2003 | Elkouh et al. ................. 442/394 |

* cited by examiner

*Primary Examiner* — Katarzyna Wyrozebski Lee  
*Assistant Examiner* — Vishal I Patel  
(74) *Attorney, Agent, or Firm* — Robert Nathans

(57) ABSTRACT

A novel molded fabric is made by bringing a first patterned group of numerous discrete disjoint elements positioned on a first side of a contact boundary extending throughout the thickness of the fabric being molded, together with a second patterned group of numerous discrete disjoint elements, overlapping the first group of discrete disjoint elements, on the opposite side of the contact boundary, and joining the elements together at their tip portions. Various techniques are disclosed for maintaining separation of overlapping cross-over portions of the thread elements crossing each other during joining the terminal portions together, so that they simulate woven cloth. First and second rolls can carry the elements in molten form within cavities in the roller surfaces or patterns of solid elements within first and second matrices, can be joined together at the nip of the rolls by heat or chemical means to produce substantial savings in fabric manufacture.

20 Claims, 26 Drawing Sheets

98 99 100

MOLDED FABRIC AND METHODS OF MANUFACTURE

RELATED APPLICATION

This application claims the benefit of provisional application No. 60/786,506 filed Mar. 28, 2006.

BACKGROUND OF THE INVENTION

The present invention relates generally to the field of textiles and woven fabrics, and to methods of fabricating woven textiles.

Textiles and the myriad weave patterns used to create them have existed almost as long as recorded history. The only alternatives to woven fabrics were skins and felts, one created biologically and the other created with highly entangled fibers but without a deliberate pattern to the entanglement.

Woven fabrics have always been created sequentially. This means that individual threads were combined by interleaving and overlapping with other threads in repeated patterns, one thread or one group of threads at a time. Threads might themselves be combinations of smaller threads or individual, natural or man made fibers. A fixed width of a fabric in a loom designed for weaving is increased in length by the width of one thread or one group of threads at a time. This sequential assembly of fabric, necessitated by the often complex interleaving and overlapping of threads in substantially orthogonal groupings, makes the creation of fabric a slow and labor-intensive process.

By contrast, felts and other non-woven fabrics are created in a parallel fashion. This means that all of the fibers or threads used to make up the final fabric are laid simultaneously as a highly entangled thin layer. This process is much faster than the sequential assembly described above, but the resulting fabric does not have the same mechanical characteristics as the woven material. U.S. Pat. No. 3,149,456 issued to Tenney, teaches that a molding of fabric from synthetics is possible in which the approximation of individual, independent threads crossing one over or under another is possible by molding columns between thread intersections substantially perpendicular to the plane of the fabric, said columns being long enough to permit a limited degree of movement between the crossing threads connected by each column. The columns enabled the use of a sinuous-surface mold without "reentrant" elements, or side actions, or inserts, but the resulting fabric merely approximated the truly individual, independent threads of a conventionally woven fabric. A goal of the present invention is to create separate, unconnected threads in a woven pattern, where overlapping thread intersections have no undesired connecting elements therebetween.

U.S. Pat. No. 2,276,608 issued to Bugge teaches that previously formed warp threads, optionally coated with adhesion preventing material, can be overmolded with weft threads that pass over and under the parallel array of warp threads in a woven fashion by: "the use of two opposed surfaces which are provided with a series of parallel grooves and with partial grooves crossing the parallel grooves. Previously formed warp threads are arranged in the parallel grooves and the space between the surfaces is supplied with a mass of artificial silk. The surfaces are then brought together so as to force the material into the partial grooves to form in situ weft threads crossing and interwoven with the warp threads." The previously formed warp threads form parts of the surfaces of the cavities of the partial grooves within such a mold in which the weft threads are molded in situ. This means that there is contact during molding between the previously formed warp threads and the weft threads being formed in situ. Without adhesion preventing coating previously applied to the warp threads, the weft threads could adhere to the warp threads. Moreover, the weft threads would conform to the exposed surface of the previously formed warp threads. In any practical implementation of the mold Bugge describes the partial grooves will incorporate at least half the circumference of the previously formed warp threads into the surfaces of the cavities forming the weft threads in situ. This forms many joints in the finished fabric that, though they are not adhered to each other, nevertheless add stiffness to the fabric, especially when the fabric so molded is stretched along a dimension diagonal to the warp or weft threads.

The aforesaid Bugge prior art patent requires that previously formed warp threads must pass straight through either a rotary or flat plate mold. The resulting fabric must therefore have warp threads that are straight, with weft threads making sinuous paths over and under the straight and parallel warp threads. This imposes a limit on the types of fabrics that can be molded by such a process, since there are many fabrics in which both the warp and weft form sinuous paths over and under each other, much like the column-connected threads described by Tenney. Moreover, in any practical embodiment of such a process, it is likely that the warp threads will pass through the rotary or plate mold under some non-zero amount of tension. During molding, the weft threads being molded will shrink during hardening or cooling, creating a tension in the weft direction different from the tension of the warp threads. This will cause wrinkling of the fabric when released from the mold, a characteristic that is not always desirable and must in any case be controlled.

Both the aforesaid Tenney and Bugge patents describe fabric molding processes. While the present invention includes molding molten or fluid material, it also includes thread forming methods in which elements can be formed by being printed and/or laminated in novel ways to accomplish a woven fabric of separate threads. Applicant's printed or laminated or other non-molded embodiments were not envisioned by the aforesaid Bugge or Tenney references and are however to be included under the term "molded" as used by applicant in its broader sense as to shape or form as permitted by the unabridged dictionary.

BRIEF SUMMARY OF PREFERRED EMBODIMENTS OF THE INVENTION

It is a goal of preferred molding embodiments of the present invention to mold a fabric in which there are no previously formed thread components passing through the mold. It is a further goal of preferred molding embodiments of the present invention to mold both the warp and weft threads from a concatenation of disjoint elements occurring nearly simultaneously in the same mold. It is a further goal of preferred molding embodiments of the present invention to mold a fabric in which the overlapping and underlapping crossings of threads being molded do not contact each other during molding, nor comprise parts of the surfaces of the cavities forming the threads, and thus do not require anti-adhesion coatings to prevent bonding between threads that cross. It is a further goal of preferred molding embodiments of the present invention to mold a fabric in which the thread crossings do not form joints that stiffen the fabric. It is a further goal of preferred molding embodiments of the present invention to mold a fabric in which the warp and weft threads can all be molded at similar conditions in the same mold, such that there are not differences in tension in the resulting warp and weft threads. It is a further goal of one of the preferred molding embodiments of the present invention to mold a fabric in which the warp threads do not have to lie in straight line paths in the mold or in the resulting molded fabric. All of these novel features contemplated in preferred molding embodiments of the present invention constitute improvements upon the inventions taught by Bugge and Tenney.

The resulting fabric meeting these goals has a first group of numerous discrete disjoint elements positioned on a first side of a contact boundary extending throughout the thickness of the fabric being molded or formed and a second group of numerous discrete disjoint elements positioned on a second side of the contact boundary opposite said first side and wherein the numerous discrete disjoint elements are joined together at areas of contact of first and second groups of disjoint elements at end portions of the elements and only at the contact boundary, and not at over-lapping and under-lapping crossings of portions of the first and second groups of discrete disjoint elements away from the areas of contact at the contact boundary.

DETAILED DESCRIPTION OF PREFERRED EMBODIMENTS OF THE INVENTION

Figure 1:
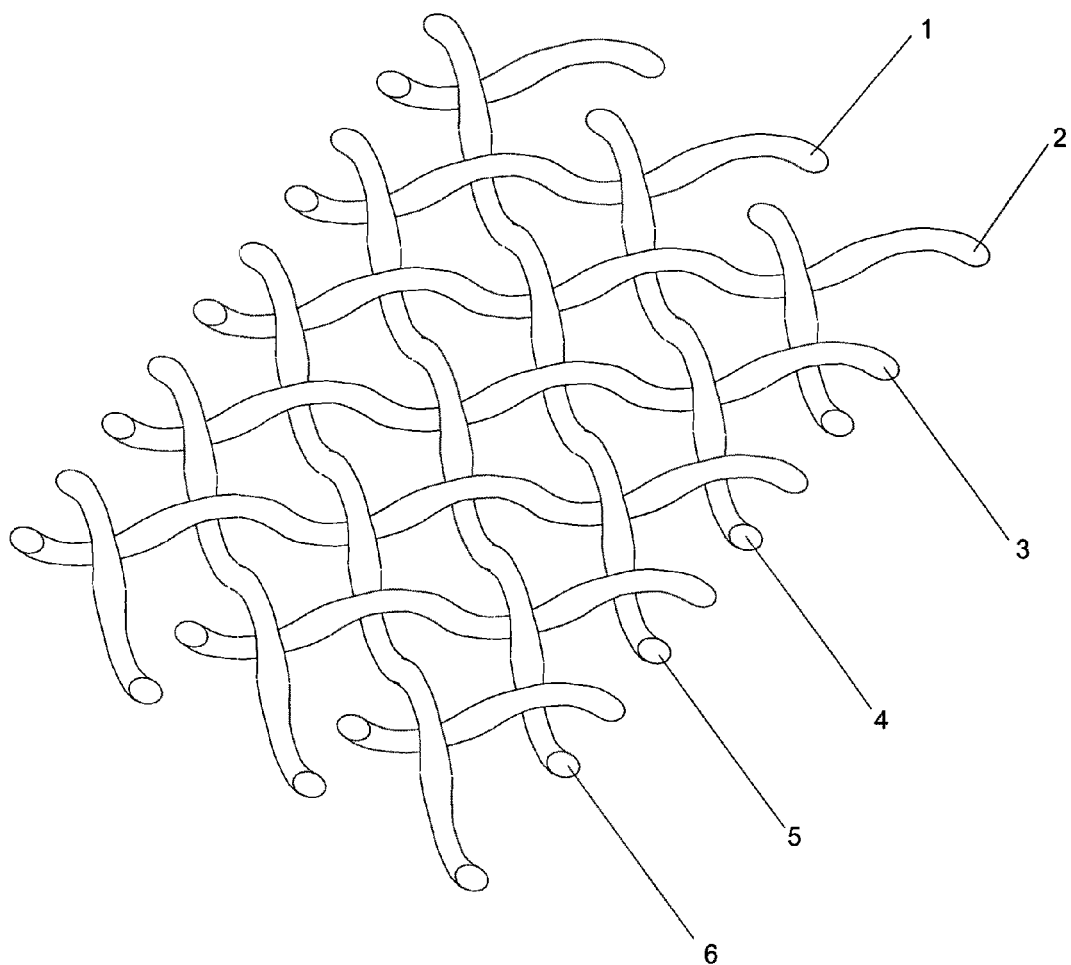
FIG. 1 shows a representative fabric weave in an oblique view.

It is the subject of this novel invention to describe methods of making a woven fabric by parallel means with any of the many weave patterns used in prior art, so as to create a faster and less expensive means of weaving textiles. It is a further subject of this novel inventive concept to describe some but certainly not all of the new capabilities of fabrics enabled by the invention. All woven fabrics contain threads (also known as strands or fibers, and hereinafter called threads) that over-lap and cross each other in organized and patterned ways. The threads may be of any shape or size. For the purposes of the discussion of this novel invention, the word "fabric" will be used hereinafter to include all fabrics woven in any pattern and configuration, including weaves comprising discontinuous pieces of thread joined to one or many other discontinuous pieces of thread or to themselves in loops or circlets. The word "fabric" will further include weaves without discernable patterns, including felts and chaotic weaves. Conceptually, there is a surface, or more than one surface, which divide(s) the thickness of fabric in such a way that those elements of the fabric lying on one side of the surface do not intersect each other, and those elements lying on the other side of said contact surface and between the next adjacent contact surface do not intersect each other. These non-inter-secting, non-overlapping groups of elements will hereinafter be called disjoint elements. This imagined surface (or surfaces, hereinafter called the contact-surface(s)), if used to divide the fabric through its thickness, would yield two (or more) groups of disjoint elements, each lying on either side of each contact surface. If any of the methods to be described below are employed to simultaneously or separately create these groups of disjoint bodies, and either simultaneously or sequentially join, or concatenate, these groups together at each of their areas of penetration and connection through the contact-surface, the result will be non-disjoint bodies having the characteristics of a woven fabric.

What follows is a description of those various methods for creating and joining (also called concatenating) the groups of disjoint elements. The discussion will utilize the case of a fabric with one contact-surface, though it will be clear to those practiced in the art that the methods described can apply to fabrics having more than one contact-surface.

The methods to be described share a number of operative concepts. Every method comprises means for creating the groups of disjoint elements, a means for preventing the joining together of any of the disjoint elements except where those elements penetrate the contact-surface, and a means for maintaining the junction or creating the junction of disjoint elements at all or many areas of penetration of the contact-surface.

Furthermore, the groups of disjoint elements may be created by assembling, punching, cutting, casting, molding, printing, spraying, injecting, or drawing thread material, using solvent, or temperature or pressure or chemistry or a combination of these to effect the shaping and flow of the thread material. Further still, the means for preventing the joining together of disjoint elements may include mold release materials, differential solvents, differential temperatures and or pressures, applied barrier coatings, pre- or post-inserted barrier elements or bodies, mechanical separation, utilization of different liquid, plastic and solid phase states of the thread material, timing differentials in material states, and temporary mold barriers later removed by replacement, dissolution, liquefaction or fracture. Even further still, methods of maintaining the joint, or joining the groups of disjoint bodies at each of the points of their penetration through the contact-surface may include liquid phase communication of the thread material through perforations of the contact-surface, solvent, adhesive, thermal or welded joining of points of penetration, and mechanical interlocking joining of points of penetration.

In addition to being parallel as opposed to sequential, the methods of fabrication described below can be either batch or continuous methods. In the batch method, the dimensions of the fabric created are limited by the size of the tooling used to create the disjoint elements, though the fabrics so created may later be joined to each other to form larger pieces. In the continuous method, the tooling used to create the disjoint elements is either reciprocating or rotary, such that the thickness and one other dimension of the fabric being made, usually the width, are fixed, and the other dimension, usually the length, can be created in a continuous web by the circumferential featuring of a rotary tool, or the repeated, joined, progressive addition of segments by reciprocating tools.

The foregoing discussion of global commonalities between various methods of fabrication is useful in articulating that the invention can be embodied in many novel, inventive and different ways, and it is important to note here that the foregoing discussion is not intended as an exhaustive or comprehensive list of all possible methods of fabrication. Rather, the invention is predicated on the recognition that the concept of a contact-surface in a fabric identifies the possibility of assembling the fabric from many disjoint elements instead of continuous, or piecewise-continuous prefabricated threads. Thus any weave in which a contact-surface (or surfaces) can be discerned is a candidate for fabrication with these new inventive methods. In addition, the parallel construction of fabric enables new kinds of fabric with new functionalities and form factors. For example, and by no means implying only these examples, fabrics that are not planar, fabrics that have novel inter-joining of disjoint elements to create hinges or mechanical bending properties, fabrics with different, or engineered thread material properties as a function of dimension, and elements with molded-in or molded-on features, such as plates or "hairs" all become possible. In short, fabrics no longer have to be made of thread in order to be woven. Because of this, whole new classes of fabrics and fabric functions become possible. Joining together patterned arrays of disjoint elements per se has been employed in other fields, especially in casting. The novel addition here is to employ inventive methods to effect a resulting material that has the characteristics of woven fabric, which is to say overlapping and intersecting elements which can slide and rotate and bend and translate relative to each other. It constitutes a new alternative to weaving.

It will be evident that the scale of the processes to be described can vary from macroscopic to microscopic, and is limited only by the limits of machining capability and cost. It will further be evident that although only straight "over and under", planar weaving is described, any planar or non-planar weave in which a contact-surface or surfaces can be identified can be made with an essentially similar process.

The first embodiment to be described is the punching and lamination of two layers of sheet material, the resulting fabric being as thick as the sum of the thicknesses of the two original materials.

In the first embodiment, two sheets of material are punched into patterned arrays of disjoint elements, hereinafter in first embodiment called pieces, held fixed relative to their original positions in each sheet. The pieces of one sheet constitute the disjoint elements from one side of a contact surface for a given fabric, and the pieces from the second sheet constitute the disjoint elements from the other side of said contact surface. Alternatively, pre-punched pieces are arranged or distributed in patterned arrays and held in position. The patterned arrays of each sheet are then brought into juxtaposition with each other, such that the contact-surface penetration areas of disjoint pieces from the one sheet of the fabric weave being made are in matching contact with corresponding contact-surface penetration areas of disjoint pieces from the second sheet. The areas of contact-surface penetration are then joined by any of a number of means.

One means of joining the areas of contact-surface penetration is by the application of heat in those areas if the materials can be melt-joined or welded by heat. Another is to apply solvent or adhesive to those areas of contact-surface penetration and then bring the corresponding areas of the two punched sheets into intimate contact to effect a bond. A third method is to coat the areas of the facing sheet surfaces with a third material that prevents the bonding of the two sheets wherever the material is applied, then to apply heat to the entire assembly in order to effect melt bonding or welding in only those areas not covered by the third material. Alternatively the third material can be a resist which negates the effect of globally applied solvent or adhesive or heat such that only those areas not covered by the third material are bonded together. Because the disjoint elements can be created from patterned cutting or punching of a continuous sheet, a laminated fabric assembly lends itself to a rotary or intermittent reciprocating motion process.

In the rotary process, the continuous sheets, known as and hereinafter called webs, are punched by rotary dies with vacuum that cut, or punch, and hold the cut pieces in fixed relationship to each other while transferring from the punching nip to a laminating nip. Such a process affords the opportunity to remove unused parts of the webs, known as and hereinafter called the waste matrix, also by rotary means.

If the waste matrix is reduced to nothing, or removal of the matrix is delayed until after the disjoint groups are joined at their areas of contact-surface penetration, it is further possible to cut and laminate the fabric in the same nip.

An alternative embodiment creates a disjoint waste matrix, which does not lend itself as easily to rotary removal. In this instance it is possible to laminate the fabric and then punch out the disjoint waste matrix, in effect delaying the creation of the waste matrix until after creation of the fabric.

If the process is vertically integrated to include the coating or casting of the webs themselves from a melt or solvent or other means, the steps of punching or cutting can be eliminated, and the process comes to resemble gravure printing, but with thread material as "ink", with the third, bond-resisting material as a second "ink", and the thickness of the inks theoretically ranging from many times thinner than the thread width to many times thicker. Furthermore, unlike gravure printing, the ink is not transferred to a moving web ("paper"), but is instead transferred onto, or joined onto, a juxtaposed pattern of "ink"; like printing an image composed of disjoint inked areas onto another image composed of disjoint inked areas in midair. This is not to preclude using a carrier web to transport the "printed weave" from the printing interface onto a receiving roll.

It should be noted here that the use of inks with novel characteristics, such as electrical conductivity, makes this woven material fabrication method capable of new functionality, such as fabric with electronic memory, tactile sensing characteristics, illumination and other electronic circuits. It further enables the idea of the "weave" being itself constructed as a circuit, thus enabling printed circuit boards without the board. By selective use of the bond resisting material as an electrical insulator or conductor, many interesting and useful new circuit constructions are possible.

The foregoing applies equally to the methods that follow.

In the rotary process described in the foregoing paragraphs, the groups of disjoint elements are created, then brought together and joined at their areas of penetration of the contact-surface. Because the joining of the disjoint elements occurs separately in time from the creation of the disjoint elements, the joint has to be effected by one of many means, such as heat, adhesive, etc. It is desirable in many instances to avoid the creation of a joint, as joints are often imperfect, and often are the first locations of tensile or flexural failure. Thus a fabrication method where the areas of contact-surface penetration are in constant communication during the creation of the disjoint elements, such that the disjoint elements on one side of the contact-surface are formed simultaneously with those disjoint elements on the other side of the contact-surface, can insure a fluid communication through the contact-surface penetration areas of the disjoint elements while the thread material is in a liquid, flowing state. Because the disjoint elements are cast or injected or otherwise molded together, there is no interface to be joined or rejoined, and there are no joints.

In order to make both groups of disjoint elements simultaneously and in intimate fluid contact, there must exist some form of barrier between the groups of disjoint elements on either side of the contact-surface everywhere other than at the areas of contact-surface penetration. This barrier has the function of preventing communication and bonding of materials contacting its opposing surfaces, and, further, does not itself bond to the materials that contact it, either by virtue of its chemical or mechanical properties or because of a pre-applied mold-release type coating. This barrier may take the form of a perforated film, of a printed, spread, sprayed or otherwise applied anti-bonding or release agent, or physical barrier walls or dividers or pieces interleaved between the disjoint element groups in order to prevent the communication and/or bonding of disjoint elements where those on one side of the contact-surface overlap or intersect those on the other side of the contact-surface. It may be desirable to leave this barrier or barriers in place, or it may be desirable to remove it after creation of the fabric is complete. In order to accomplish this, the barrier may be of a material that can be selectively dissolved, melted, fractured, or vaporized, or by other means, without affecting the surrounding weave. If the barrier is to remain, it may itself be cast or injected into the non-contact-surface-penetration areas between the disjoint element groups.

Finally, the barrier may be temporary or localized to only the solidification zone of the thread material, especially in the instance of a continuous rotary or reciprocal method of fabrication. In the first preferred embodiment of this method of manufacture, a mold made of a structural material with cavities corresponding to volumes and locations of the disjoint elements on one side of the contact-surface is brought into contact with a barrier film with perforations in the film corresponding to the contact-surface penetration areas of the weave being fabricated. The perforations are brought into alignment with the areas of the disjoint element volumes that penetrate the contact-surface in a mold made of a structural material. A second mold made of a structural material, having cavities corresponding to volumes and locations of the disjoint elements on the other side of said contact-surface is brought into contact with a barrier film, also with alignment to the perforations in the barrier film in the same manner as in the first mold made of a structural material.

The term mold made of a structural material is here used to describe a constraining matrix of structural material and empty volumes that, when filled with thread material which can be in molten form create the disjoint element group shapes and locations relative to the contact-surface. This frame might be a rigid flat or curved material, or it could be a flexible belt, or the surface of a rotating drum; the cavities defining the disjoint elements being open not only to the side facing the contact-surface, but also to the side facing away from the contact-surface in order to effect filling with the liquid thread material.

Once the molds made of a structural material are brought into aligned, opposing contact with the perforated barrier film, with the barrier film sandwiched between the molds made of a structural material, liquid thread material is introduced into the cavities of the molds by any of a number of means. The liquid thread material, filling cavities that communicate through the perforations of the barrier film with cavities in the opposing mold, passes through the perforations and intermingles irreversibly with the liquid thread material introduced into the other mold. Alternatively, both molds are filled from one side through one mold, passing through the perforations in the barrier film and filling the cavities in the other mold.

As the liquid thread material solidifies, the disjoint element cavities on opposing sides of the barrier film are joined together wherever the barrier film is perforated. The barrier film itself becomes inextricably bound between the original disjoint element groups, but does not anywhere adhere to the thread material by virtue of its non-bonding properties. The casting frames are lifted or pulled away, leaving behind the solidified and joined thread elements. The resultant weave is a fabric with a perforated barrier layer lying along the contact-surface within the thickness of the fabric. The perforations lie everywhere that the disjoint elements on one side of the contact surface penetrate to disjoint elements on the other side of the contact surface. As described above, it may be desirable to remove this barrier layer after the creation of the fabric by dissolution, mechanical extraction, melting, combustion or other means.

There are many weaves where a combination of dimensions, thread thickness, and percent open area are such that there exists a straight line path of a specific width and thickness along the contact-surface that passes through and between all of the overlapping, intersecting pairs of opposing disjoint elements in one repeat of the weave pattern. Many such straight line paths parallel to each other pass through all adjacent overlapping, intersecting pairs of opposing disjoint elements, such that, instead of a barrier film, barrier wires or strips can effect the prevention of bonding between the disjoint element groups except the areas where they penetrate the contact-surface.

Thus the casting frames can be bought into opposing, aligned, face to face contact, having between them not a barrier film, but a linear array of strips or wires which prevent intersecting, overlapping disjoint elements from bonding to each other or to the strips or wires (hereinafter referred to as wires), again by virtue of the non-stick characters of the wires themselves, or of a non-stick coating pre-applied to the wires. These parallel wires can run along the length or across the width of the fabric being created, and can be again left in place or removed by any of the aforementioned means. Moreover, the wires can be composed of thread made of natural fibers, or of electrically conductive material in order to impart novel characteristics to the fabric.

The filling of the casting frames with liquid thread material (here liquid is intended to mean dissolved, molten, or liquid-flowing powder) can occur just at the instant of juxtaposition to each other and to the barrier film, coating or wires, or it may occur at a time long prior to such juxtaposition where is solidifies or binds in the casting frame, and is brought back to a liquid state just prior to or during juxtaposition.

Finally, it is possible and often desirable to incorporate the barrier function allocated to a barrier film or to wires instead to the casting frames themselves. The two casting frames can even become a single frame, much like a cored casting in engine block fabrication. The fabric is molded within the cavities and interstices of the casting, and the casting is later, if desired, removed by fracture, dissolution, combustion, melting, or other means.

Regarding new functionalities: because the thread material is cast, the shape, material properties, molded-in, molded-on, co-molded, mechanically interlocked, and location specific surface treatment of the molded elements can be achieved. This includes novel interlinking of cast elements to form simple machines within the weave, such as hinges, interlocking plates, beams, levers and the like. This is by no means intended as a comprehensive list. An interesting potential use of such an approach to woven textile is the use of molded elements to create antiballistic cloth such as might be used in bulletproof vests. A combination of interlinked, interlocked ceramic plates could be molded into the weave in a way that allows protection and flexibility, much like scales protect a fish.

Deliberately permitting overlapping disjoint elements from opposite groups to bond together could create rigid or semi rigid areas within the fabric, or, conversely, could create areas of enhanced or controlled bending or hinging, such as in footwear or sports garments or backpacks or any of myriad uses of fabric where controlled flexure is an important characteristic of the material used.

With the use of elastic, flexible or rigid materials, weaves created with these novel methods can extend or collapse within the thickness plane, creating for example conveyor belts capable of negotiating corners.

Each disjoint element could have molded onto an outward facing surface one or more protrusions in the form of threads, hairs, hooks, or other forms, thus enabling fabrics with novel nap and appearance, or new mechanical properties.

It must be emphasized in this discussion that the examples are not intended to be a complete or exhaustive list of applications, but only as indicators of the wide field of application of the novel method of fabrication.

FIG. 1 is an oblique view of a representative piece of a general woven fabric, consisting of threads (among which are numbered threads 1 through 6) that are intertwined over and under each other in patterned ways. In this illustration (FIG. 1) a common weave is portrayed, though this should not imply that only this particular weave is the subject of the invention. An unlimited number of weaves is possible, many of which can be fabricated by the methods described in this invention. In the illustration of FIG. 1, threads 1, 2, and 3 are interwoven with threads 4, 5, 6 such that thread 1 passes under thread 4, over thread 5 and under thread 6, thread 2 passes over thread 4, under thread 5 and over thread 6, and thread 3 passes under thread 4, over thread 5 and under thread 6. Other weaves are combinations and permutations of threads passing either over or under each other. Although the illustration in FIG. 1 depicts a weave in which there is a single layer of single thread over- or under-crossings, also referred to as intersections and referred to as intersections hereinafter, it is possible to construct fabrics in which there are multiple threads and/or two or more layers of intersections. It will be clear to those practiced in the art that those multilayer fabrics can similarly be molded with the inventive methods described herein by the use of multi-layer molds, each interface between mold layers corresponding to one layer of intersections.

Figure 2:
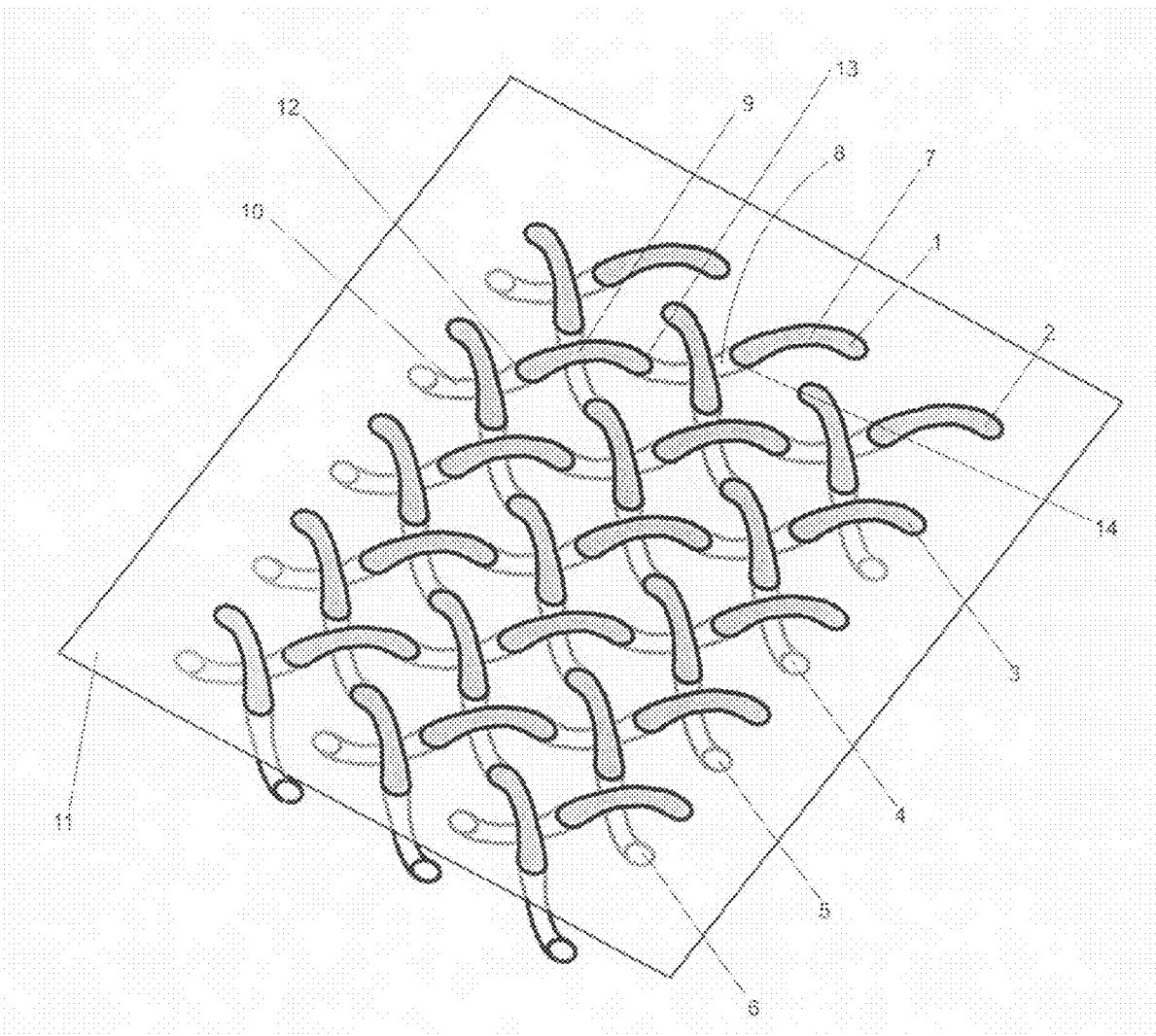
FIG. 2 shows a oblique view of a contact surface dividing the fabric thickness into two groups of disjoint elements.
Figure 3:
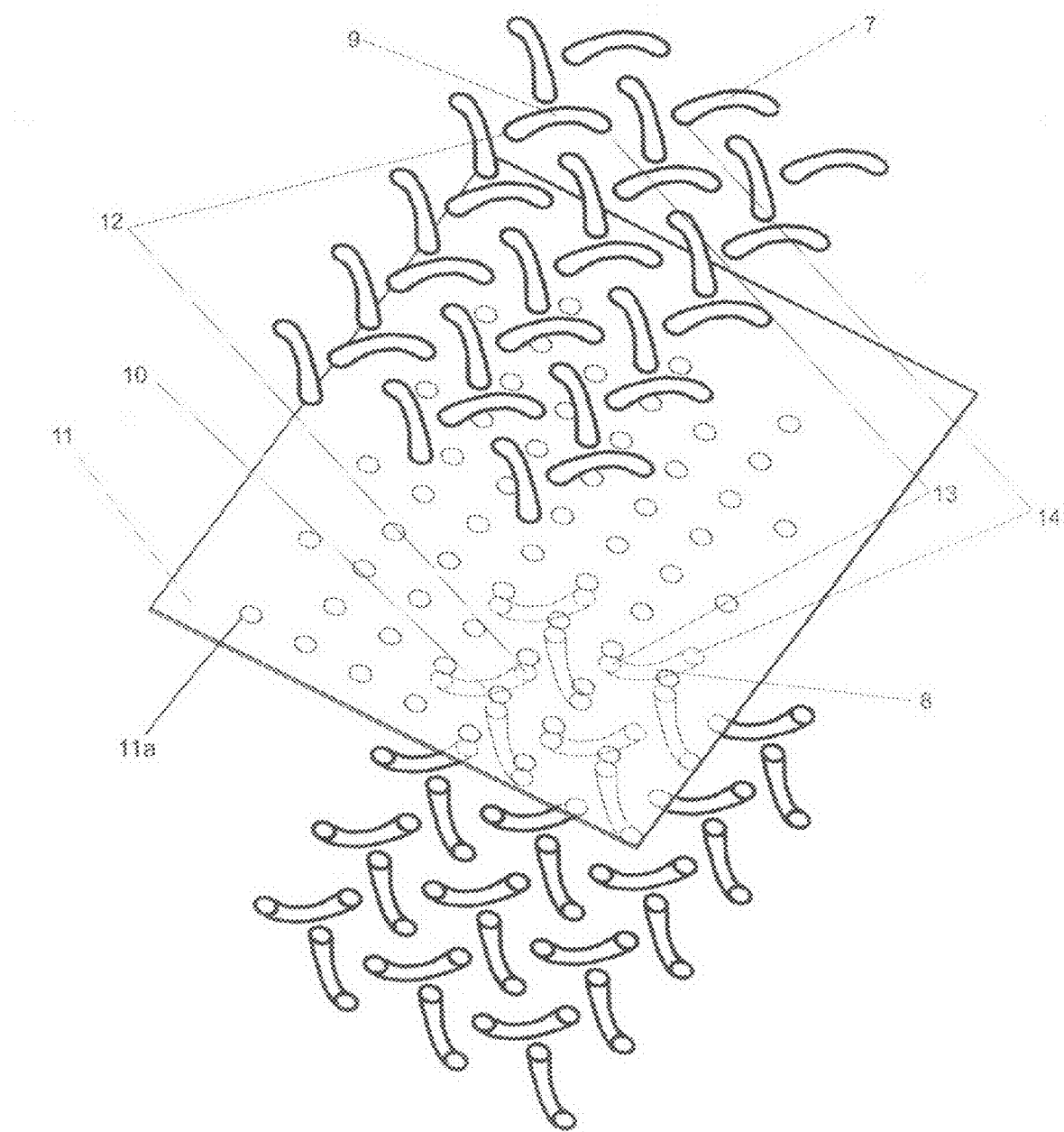
FIG. 3 shows an oblique view of two separate groups of disjoint elements interposed by a perforated barrier layer with perforations corresponding to contact surface penetrations.

There is a contact surface 11 within the thickness of the fabric that passes between intersections of the threads in such a way that all of the thread portions lying above the contact surface 11 do not intersect with each other, and all of the thread portions lying below the contact surface 11, which is to say on the opposite side of the contact surface 11, similarly do not intersect with each other. This is illustrated in FIGS. 2 and 3. Thus, for example, the thread labeled 1 lies partly above the contact surface 11 and partly below it, those portions of thread 1 lying above the contact surface 11 being labeled 7 and 9, and those parts lying below the contact surface 11 being labeled 8 and 10. The areas where the thread labeled 1 paws through the contact surface are labeled 12, 13 and 14. Every thread in the fabric will similarly lie above and below the contact surface 11, and will pass through the contact surface 11 at many locations or areas. It is important to note here that though individual threads are shown the path of a thread could be shared by more than one thread. In this instance of multiple threads, or thread groups, it will still be true that the portions of the groups lying above the contact surface 11 do not intersect each other, and the portions of those groups lying below the contact surface 11 do not intersect each other; rather the threads in each group lie substantially parallel to other threads in their group, which is not to preclude thread groups with twist. The portions of groups or portions of single threads lying above and below the contact surface 11 are disjoint, which is to say that they may lie very close together, but they do not touch in an overlapping or intersecting way. These disjoint portions of threads are called disjoint elements.

If all of the disjoint elements lying above the contact surface 11 are molded or cast, and all of the disjoint elements lying below the contact surface 11 are similarly molded or cast, and the relative positions of the disjoint elements above and below the contact surface 11 are maintained, then the areas where the disjoint elements above the contact surface 11 penetrate the contact surface 11 will be aligned with the areas where the disjoint elements below the contact surface 11 penetrate the contact surface 11. These alignment areas are illustrated for example by the areas of contact surface penetration labeled 12, 13, and 14 in FIGS. 2 and 3. If the aligned faces of the disjoint elements below the contact surface 11 are joined each to the aligned faces of the disjoint elements above the contact surface 11, the resulting joined elements will form a fabric weave having the intersections of threads characteristic of fabric woven by means of prior art, in other words, woven on a loom. If the material of the threads used to cast the disjoint element groups has properties similar to the threads used to create a similar weave to that woven by means of prior art, then the molded fabric will have more of the characteristics of the fabric woven by means of prior art, hereinafter referred to as traditionally woven fabric. If the molding of the elements above and below the contact surface occurs at the same time, with the molds in intimate juxtaposition so that the areas of penetration of the contact surface 11 by the disjoint elements are in fluid communication across the contact surface 11 by the thread material (here implied to be either liquid, dissolved, molten, or a liquid-like powder), then the joining together of the contact surface penetration areas after molding is obviated, and the joints do not exist. This further approximates the traditionally woven fabric of the same weave. It remains then, to prevent the joining together of any part of the disjoint elements lying above the contact surface 11 with the disjoint elements lying below the contact surface 11 except at their areas of penetration of the contact surface 11. In other words, wherever there is bonding of intersections between disjoint elements above the contact surface and below the contact surface, those locations will no longer have the characteristics of a woven fabric. It may be desirable to selectively bond intersections between disjoint elements, but if the purpose is to achieve a structure that behaves similarly to a traditionally woven fabric, then intersections must be un-bonded so as to be able to slide, rotate and translate across each other.

FIG. 3 may further be used to illustrate the concept of a barrier surface, with perforations at 11a, corresponding to areas of contact surface penetration by corresponding pairs of disjoint element groups such as 12, 13 and 14.

Figure 4:
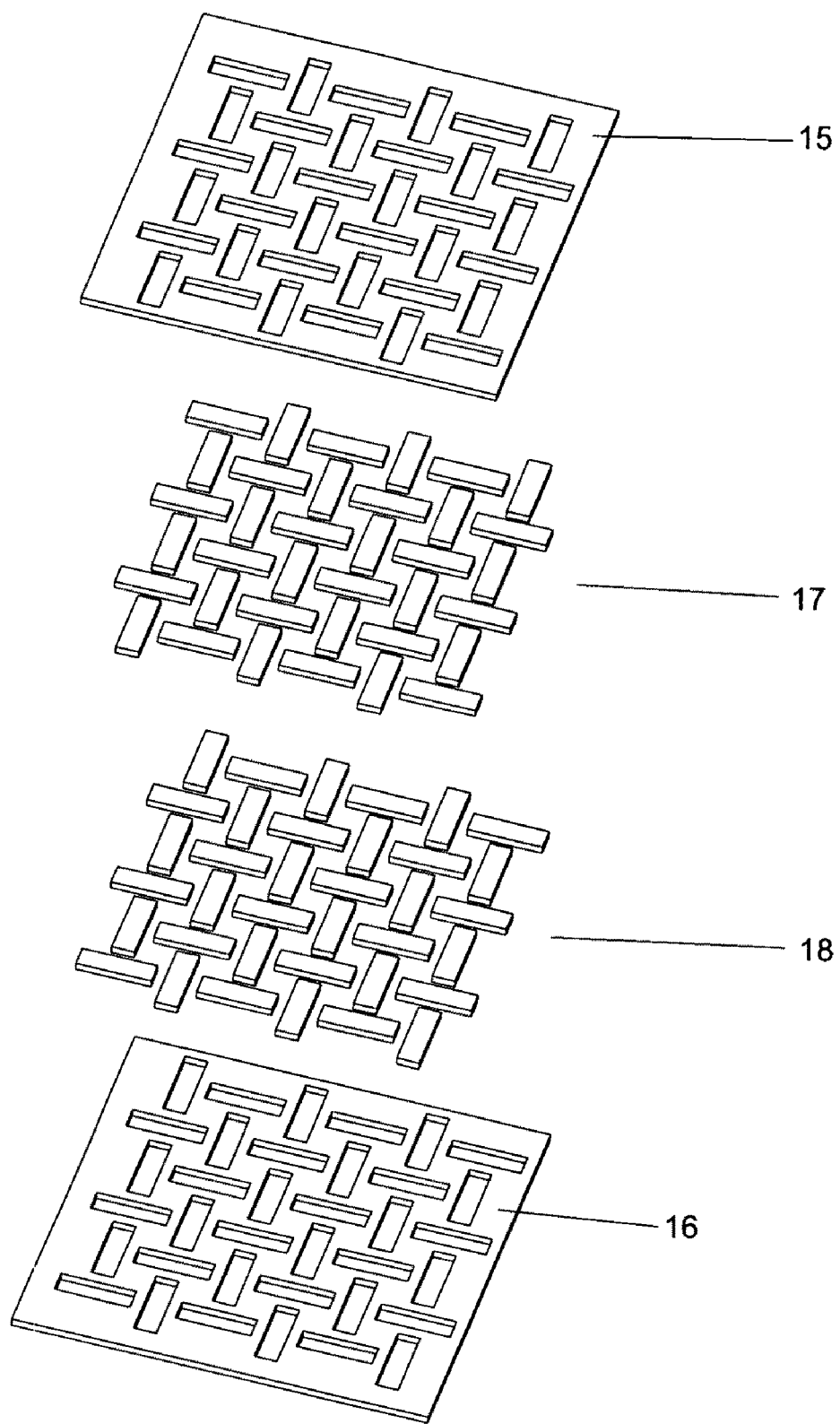
FIG. 4 shows an oblique view of opposing disjoint element groups punched from sheet.
Figure 5:
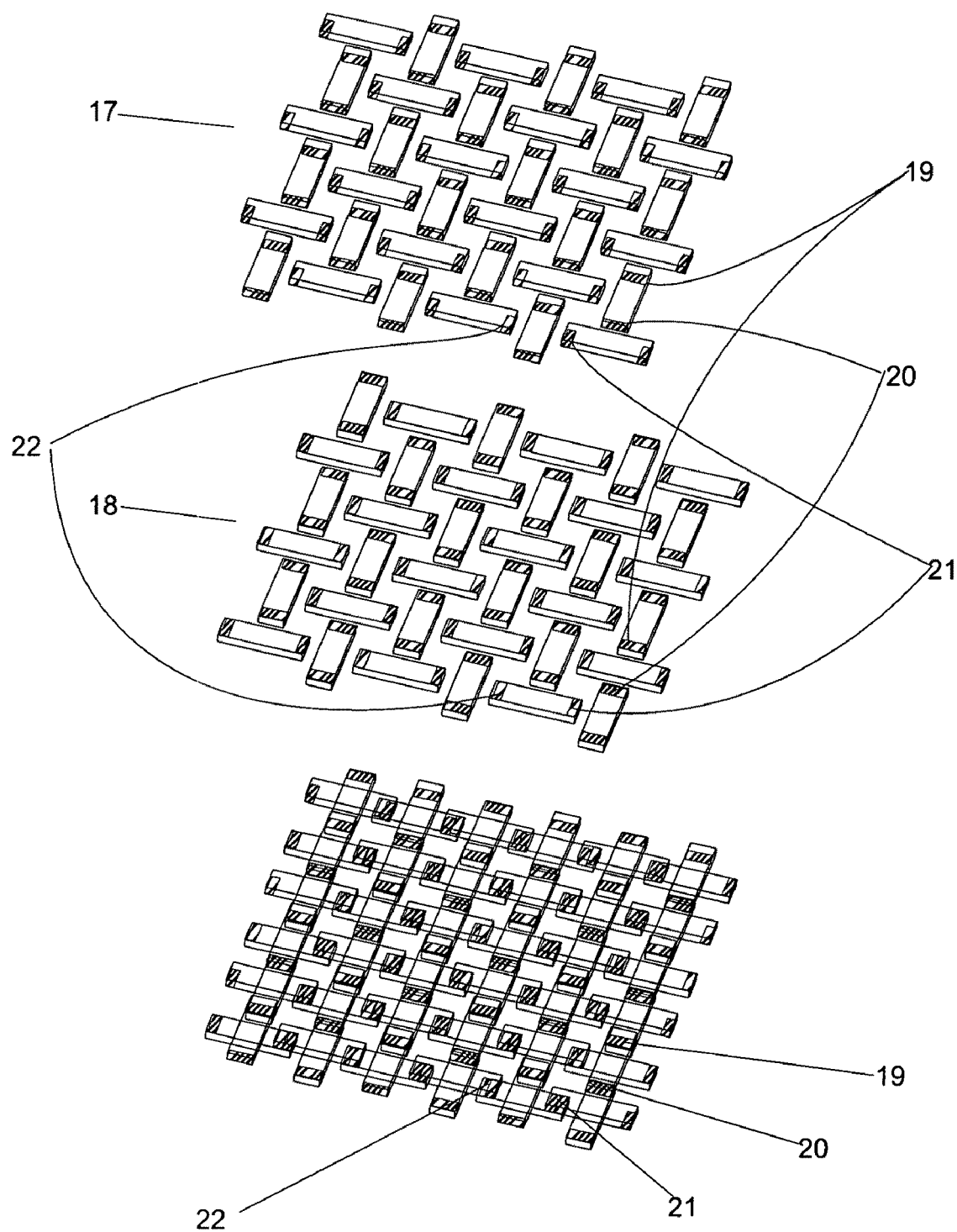
FIG. 5 shows an oblique view of opposing disjoint element groups, and said groups laminated or joined together at areas of contact surface penetration.

FIG. 4 illustrates a preferred embodiment of the laminated method of manufacture of fabric. Two groups of disjoint elements, 17, 18 are created. These groups can be created by punching, cutting, stamping from webs 15, 16, or they may be cut from strip and assembled in patterns corresponding to the patterns of disjoint elements lying above and below the contact surface of a given weave pattern. If, then, as in FIG. 5 these groups of disjoint elements are brought together in such a way that the paired, or common, areas of contact surface penetration, exemplified by 19, 20, 21, 22 are physically touching, and further, if means of bonding the areas of contact surface penetration are employed to effect a permanent bond, the result will be a woven laminate with characteristics similar to an equivalent traditional weave using the same thread material. The means of effecting bonds of the areas of contact surface penetration can be applied heat to effect a melt or weld bond, or application of solvent to effect a solvent bond, or mechanical interconnection such as snaps or buttons, or ultrasonic welding, or adhesive, or polymerization, or many other joining methods familiar to those practiced in the art.

In a preferred method illustrated in FIG. 6, the two groups of disjoint bodies, each arranged or maintained in patterns corresponding to the patterns of disjoint elements lying above and below the contact surface of a given weave pattern, are brought together in the nip of two rotary laminating rolls, 23 and 24, in such a way that their corresponding areas of contact surface penetration are in physical alignment and contact in the nip. The rotary laminating rolls are featured with heated and possibly raised or shaped areas registered with the corresponding areas of contact surface penetration of the disjoint elements 17, 18, so as to apply simultaneous heat and pressure to the areas of contact surface penetration as they pass sequentially through the nip. The thread material in this embodiment would of necessity be either thermoplastic, or coated with a heat-activated adhesive, such that the application of heat and pressure would bond the corresponding areas of contact surface penetration.

It is further preferred in this embodiment that the patterns of disjoint elements be likewise cut from continuous web material in rotary dies common in the art, being held in place on the rotary rolls by adhesion or vacuum until transfer by rolling contact and mechanical displacement or air pressure in patterned alignment onto the heated laminating roll surfaces.

Figure 6:
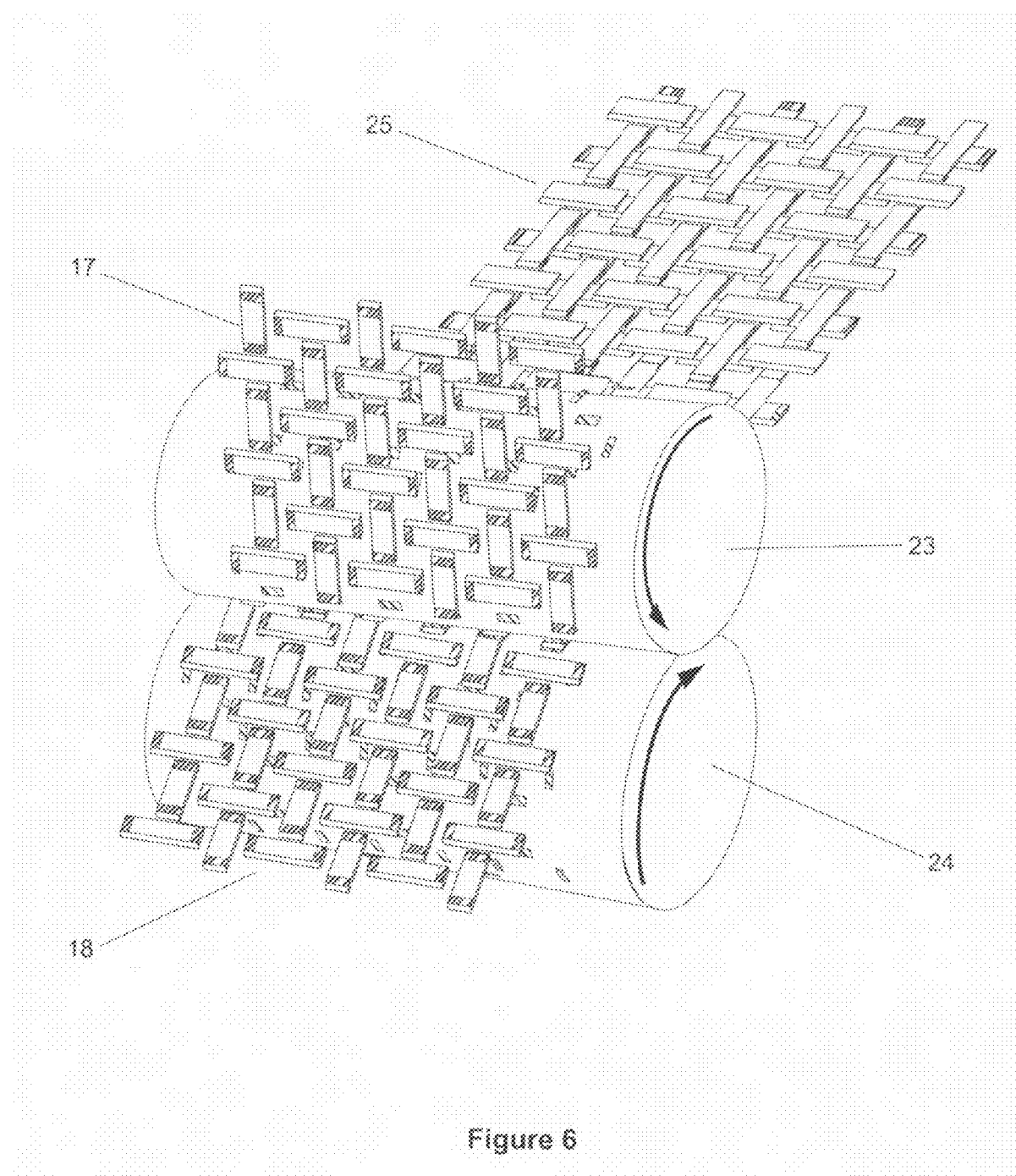
FIG. 6 shows an oblique view of rotary lamination of punched disjoint element groups.
Figure 7:
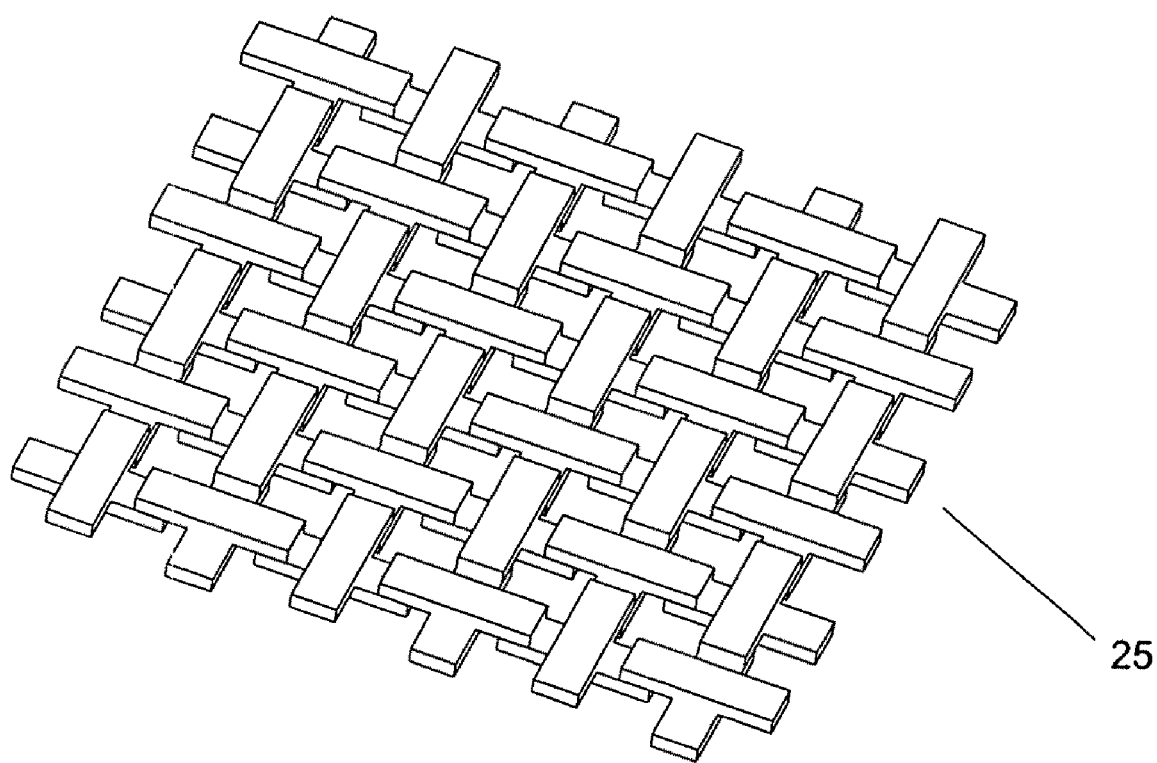
FIG. 7 shows an oblique view of a portion of finished laminated fabric from punched disjoint element groups.

The resulting composite laminated weave, 25, is illustrated in FIGS. 6 and 7.

Figure 8:
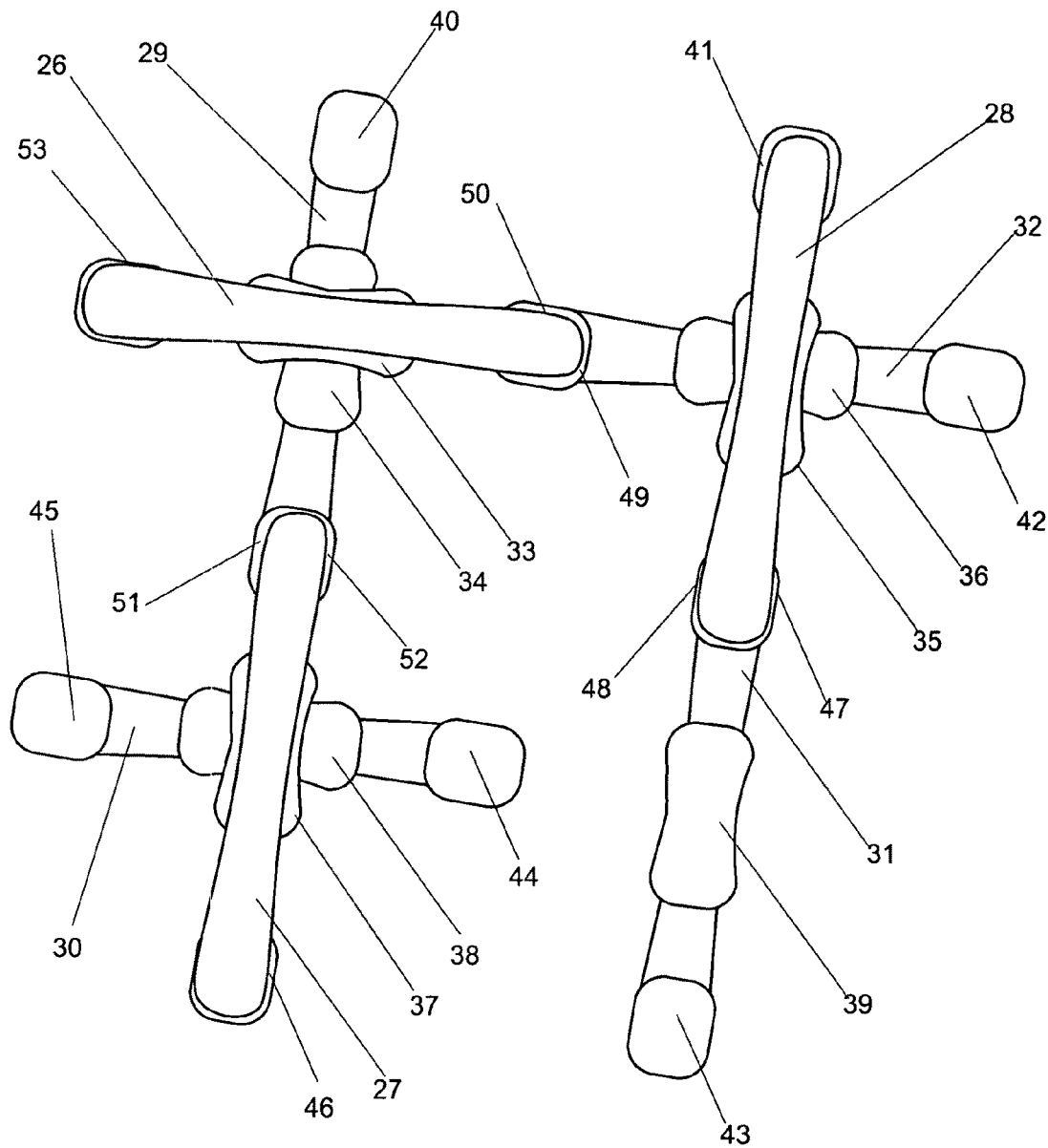
FIG. 8 shows an oblique view of individual printed disjoint elements joined at areas of contact surface penetration and prevented from joining at areas of intersection or overlap.

In another preferred embodiment of a cast method of manufacture, the disjoint elements are cast into pockets on a surface, the surface being either curved or planar, and brought into contact with a similar pocketed surface with disjoint elements corresponding to the opposite side of the contact surface. This is a process very similar to gravure printing, except that there are two gravure surfaces "printing" onto each other, the result being "ink" without the paper. Zoning within the pocketed surface creating chilled and heated areas, or an intermediate step where each of the upper and lower disjoint element groups are first overlaid with a third material applied in areas where a bond is not desired, achieve the goal of bonding only the areas of contact surface penetration. This is illustrated in FIG. 8, which is a close-up illustration of three disjoint elements from one side (upper) of the contact surface (26, 27, 28) and four elements from the opposite side (lower) of the contact surface (29,30,31,32). The intersections of the upper disjoint elements with the lower disjoint elements have been covered with a third material that prevents bonding between the upper and lower elements (33 and 34, 35 and 36, 37 and 38, 39). (Of course it is not necessary to coat both upper and lower elements with a third material; coating either alone is sufficient. It is shown here with coatings on both for symmetry) Furthermore, or instead, or omitted, the areas of contact surface penetration can be coated with adhesive, or solvent (40, 41, 42, 43, 44, 45, 46, 47 and 48, 49 and 50, 51 and 52, 53) to enhance or permit bonding without further application of heat.

Figure 9:
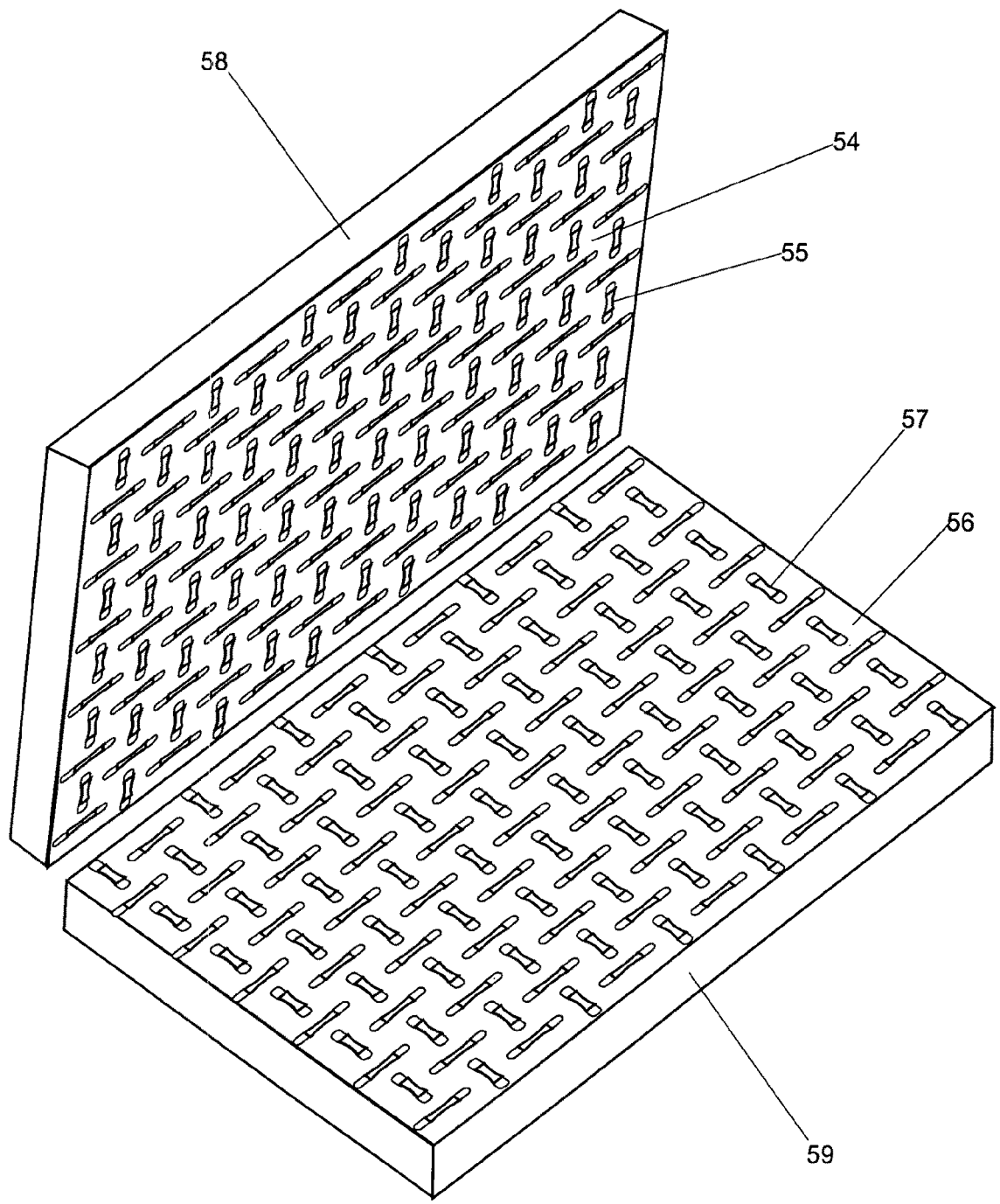
FIG. 9 shows an oblique view of mold plates with disjoint element groups and anti-adhesion patterned coatings.

In FIG. 9 a group of disjoint elements from one side of the contact surface (upper, 54) is juxtaposed to a group of disjoint elements from the other side of the contact surface (lower, 56) with the bond preventing coating exemplified on the upper group by 55; and lower group by 57. These groups of elements are cast from melt or solution or polymerizing or other material into pockets in blocks 58, upper, and 59 lower. When the two blocks are brought together face to face such that the areas of contact surface penetration of the upper disjoint elements are in physical contact with the areas of contact surface penetration of the lower disjoint elements, fusion of the areas of contact surface penetration occur while coated areas do not bond. Fusion can be achieved, as before, by heat, welding, adhesive, polymerization or solidification, or by mechanical interlocking or other means.

Figure 10:
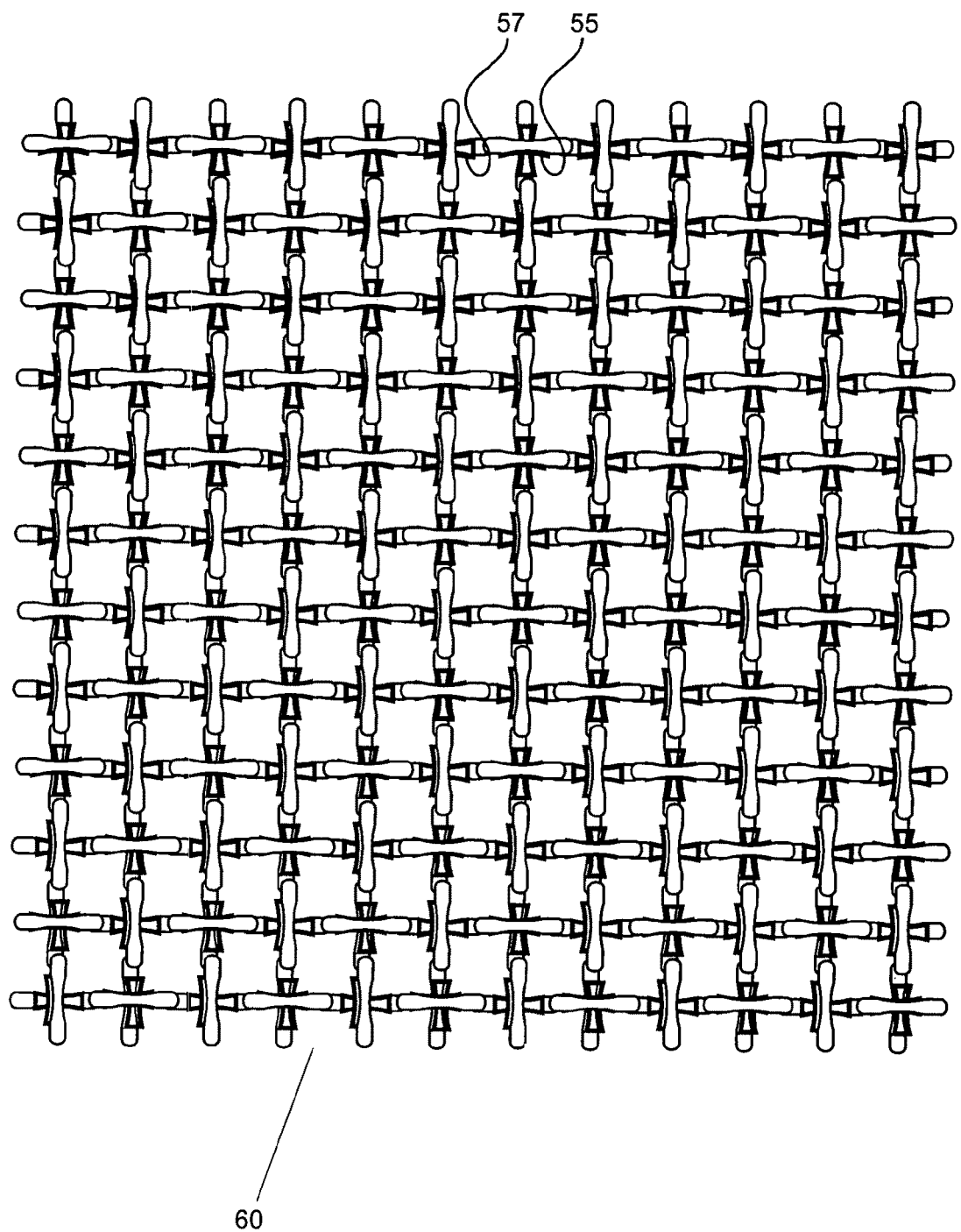
FIG. 10 shows a plan view of joined disjoint element groups resulting from the mold of FIG. 9 and illustrating the use of anti-adhesion coatings.

FIG. 10 illustrates a weave 60 resulting from joining of upper and lower disjoint element groups cast into pocketed plates and joined together at their areas of contact surface penetration.

Figure 11:
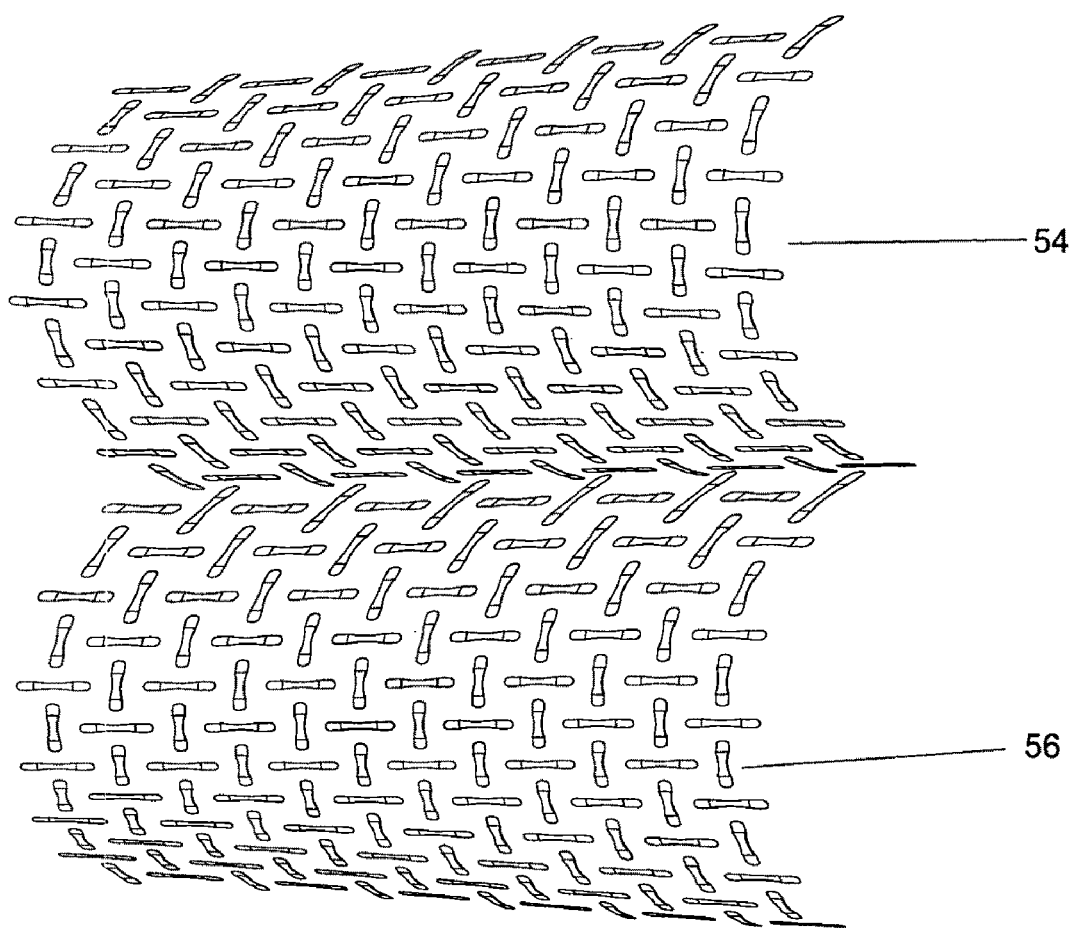
FIG. 11 shows a rotary embodiment of the mold method of joining disjoint element groups, illustrating the curved juxta-position of disjoint element groups.
Figure 12:
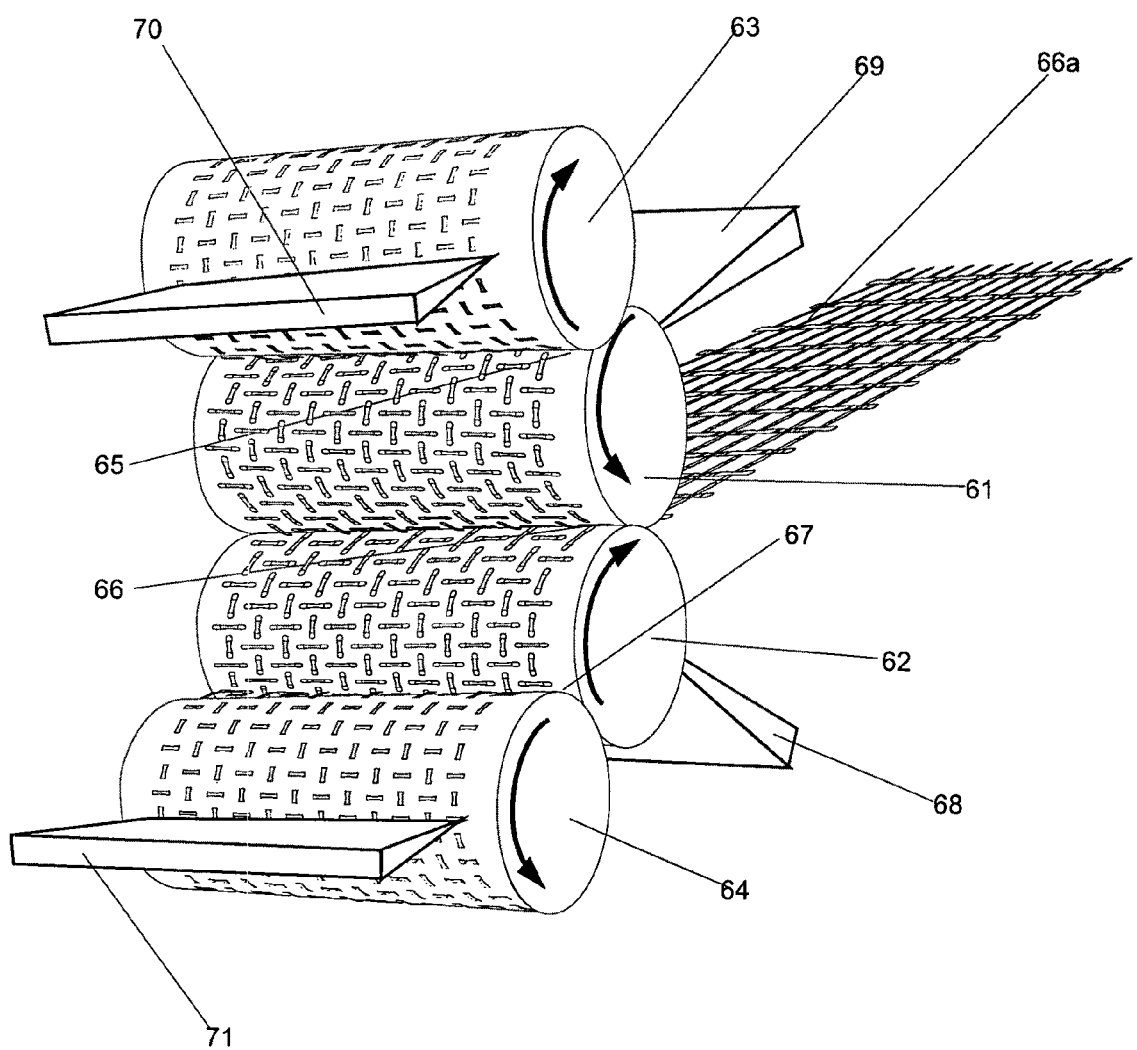
FIG. 12 shows an oblique view of a rotary molding system for coating disjoint element groups with anti-adhesion patterns and joining said groups together in a rotary nip.

FIGS. 11 and 12 extend the concept of the preferred cast embodiment to a rotary method of manufacture, again similar to gravure printing. In this instance the upper elements 54 and lower elements 56, shown isolated in FIG. 11 and in situ in FIG. 12, are on the curved and pocketed surfaces of two rotary rolls 61, 62 that together form a nip, 66. These rotary rolls are illustrated in FIG. 12, (61, 62), in a configuration with two other rotary rolls 63, 64, that form two additional nip interfaces 65, 67, one each with rolls 61, 62. In this configuration, two doctor blades or squeegees 68, 69 or other applicators known in the art apply thread material in liquid form (here meaning molten, dissolved, un-polymerized, un-solidified, un-sintered, or powdered with liquid-like flow properties) to the rolls 61, 62 in a way that fills the pockets or depressions on the surfaces of the rolls 61, 62 with the thread material. The directions of rotation of the rolls 61, 62 are such that the filled pockets then pass through the secondary nips, 65, and 67, against rolls 63, 64, where the third material that prevents bonding of the thread material to itself is applied by transfer from the rolls 63, 64. The rolls 63, 64 themselves have pockets or depressions in their surfaces which register to and align with the pockets of the rolls 61, 62, and have a shape covering the section of each pocket on rolls 61,62 where bonding of the thread material to itself is not desired. These secondary pockets are filled with the third, bond-preventing material by squeegees, doctor blades, wetted nips or other applicators known in the art, 70, 71, and have a direction of rotation that brings the filled pockets into contact with the filled pockets of the primary rolls 61, 62, and, by meniscus transfer, coats the areas of the filled pockets on the rolls 61, 62 with bond-preventing material, leaving uncoated the areas of the filled pockets on the primary rolls, 61,62, that correspond to the areas of contact surface penetration and that are to be bonded to opposing areas of contact surface penetration on the filled pockets of the opposing rotary roll.

The thread-material-filled pockets of the primary rolls 61,62 roll together in intimate contact in the nip 66, where each of the contact surface penetration areas of each of the pockets on the surface of one roll, 61, come into bonding contact \kith the corresponding contact surface penetration areas of each of the pockets on the surface of the other roll, 62, and a bond is effected. At the same time, the bond preventing coated areas come into contact in the nip 66, but a bond is not effected by virtue of the bond-preventing coating.

By arrangement of the heated and cooled zones of the rolls and the cooling of the bonded thread material emerging from the out-feeding side of the nip 66, or by solvent removal, polymerization, sintering or other processes of solidification familiar in the art, the bonded thread material of the completed molded fabric emerging from the out-feeding side of the nip 66 is solidified sufficiently to enable tensile or mechanical removal from the pockets of the rolls 61,62 in the form of a single web of woven, molded fabric 66a.

In the molded preferred embodiment of this novel invention, the disjoint element groups from opposite sides of the contact surface are formed in the void cavities of mold plates. These groups may be formed separately from each other in space and/or time, and joined by any of the many methods mentioned supra or available in prior art at their areas of contact surface penetration. In this instance, the intersecting areas of the disjoint elements where bonding is not desired may be prevented from bonding with application of a third, bond preventing material, as before. Alternatively, separators can be interposed at each of the points of intersection, or a film, perforated only at the areas of contact surface penetration, can be interposed between the molded disjoint element groups.

An interesting option that enables continuous rotary molding of fabric, which is described in more detail below, is the use of separator strips, bars, wires, strands or fluids (hereinafter referred to as separators) laid in straight lines across contiguous intersections of disjoint elements. This is possible when the weave pattern is so arranged that the intersections align in substantially straight, parallel, adjacent columns, and the entire projected area of overlap of each of the overlapped (or intersecting, when viewed normal to the thickness of the resulting fabric) disjoint elements is encompassed within the width of the separator. By making the separator wide enough to encompass the projected area of the overlap, the separator can serve the same function as the bond preventing material envisioned earlier, which function is to prevent the disjoint elements from bonding to elements on the opposite side of the contact surface except at the areas of contact surface penetration.

Figure 13:
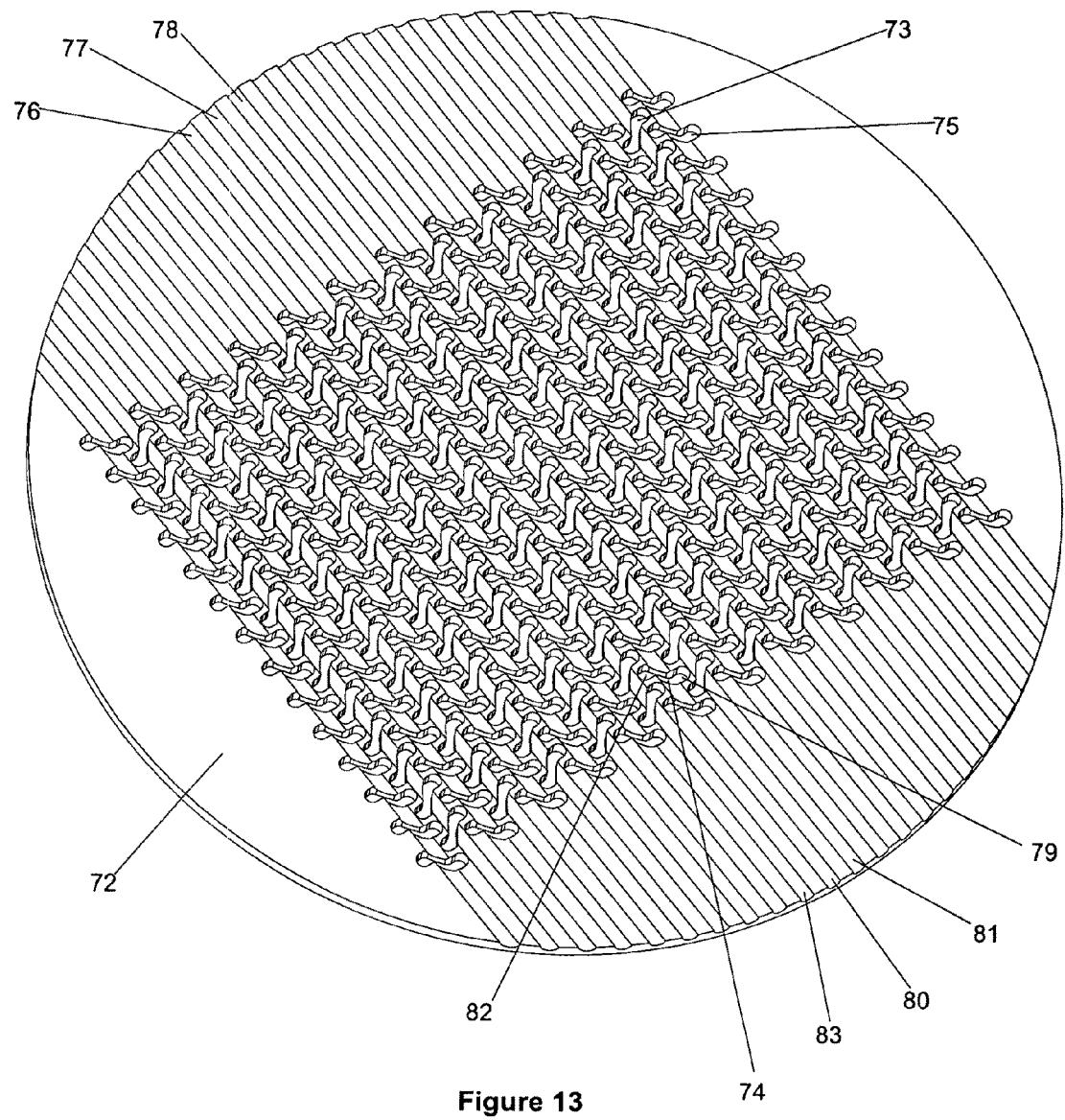
FIG. 13 shows an oblique view of a mold plate with cavities for disjoint elements from one side of a contact surface and contiguous parallel cavities for barrier strips or wires.

In FIG. 13, a section of a mold 72 for a pattern of disjoint elements, exemplified by 73, 75, and grooves for separators, exemplified by 76,77,78, is illustrated in an oblique view. Only the mold for the disjoint elements from one side of a contact surface for the pattern of weave chosen is shown. The pattern of weave in this illustrated instance is again a traditional over and under weave, though it is to be understood by an individual versed in the art that other weave patterns and disjoint element shapes are possible within the inventive concepts being described.

It is instructive to note that each of the disjoint element voids in the mold plate lie across the separator grooves. Thus for example the end of one of the disjoint element voids, 79, lies between the separator grooves 80, 81, while the other end of the disjoint element void 82 lies between the separator grooves 80, 83. The center portion of the disjoint element void 74, corresponding to the non-bonded overlapping area of intersection with the disjoint element from the opposite side of the contact surface, lies within the separator groove 80.

Figure 14:
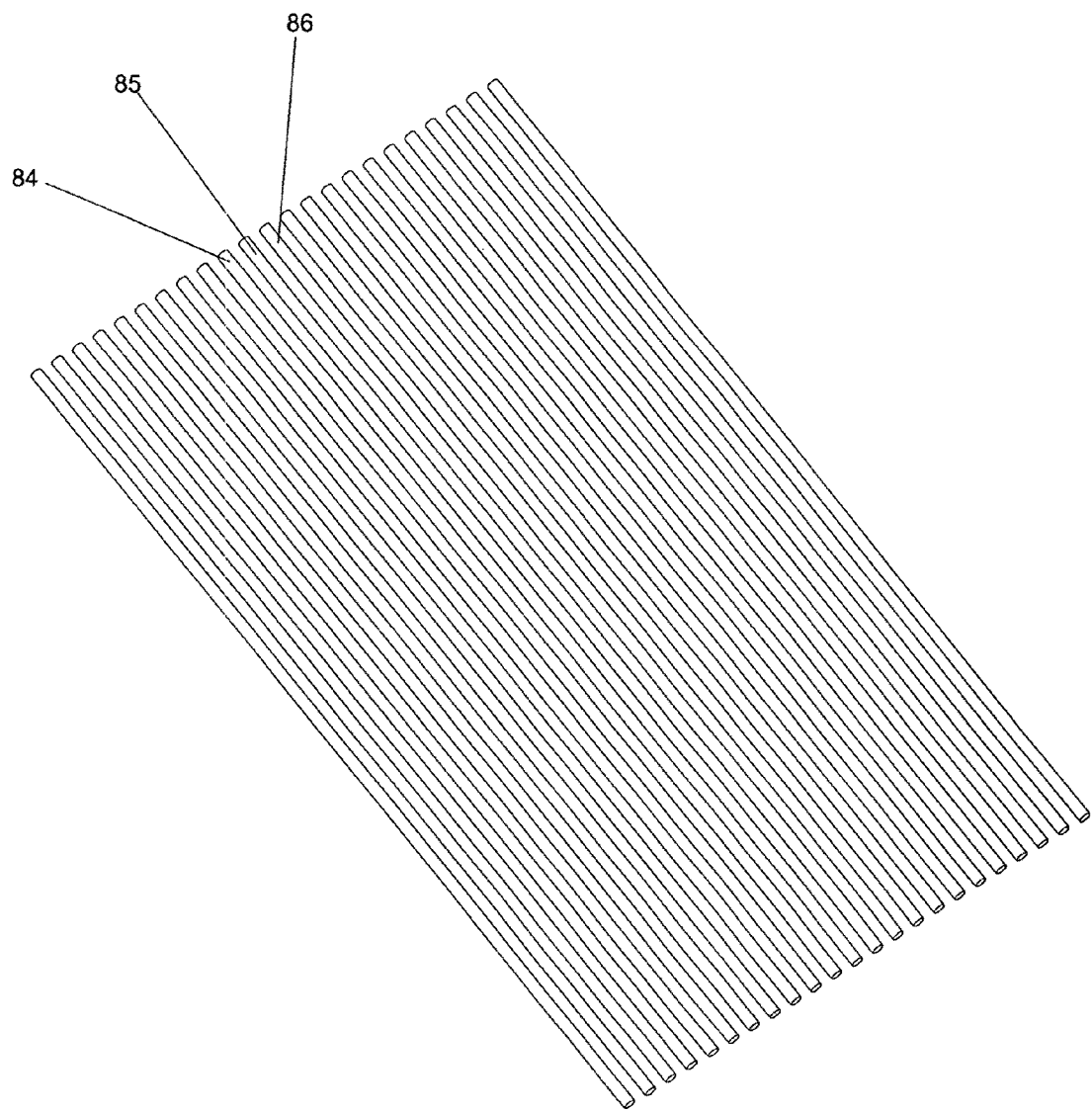
FIG. 14 shows an oblique view of parallel barrier strips or wires for preventing the joining of opposing disjoint element groups at overlapping intersections.
Figure 15:
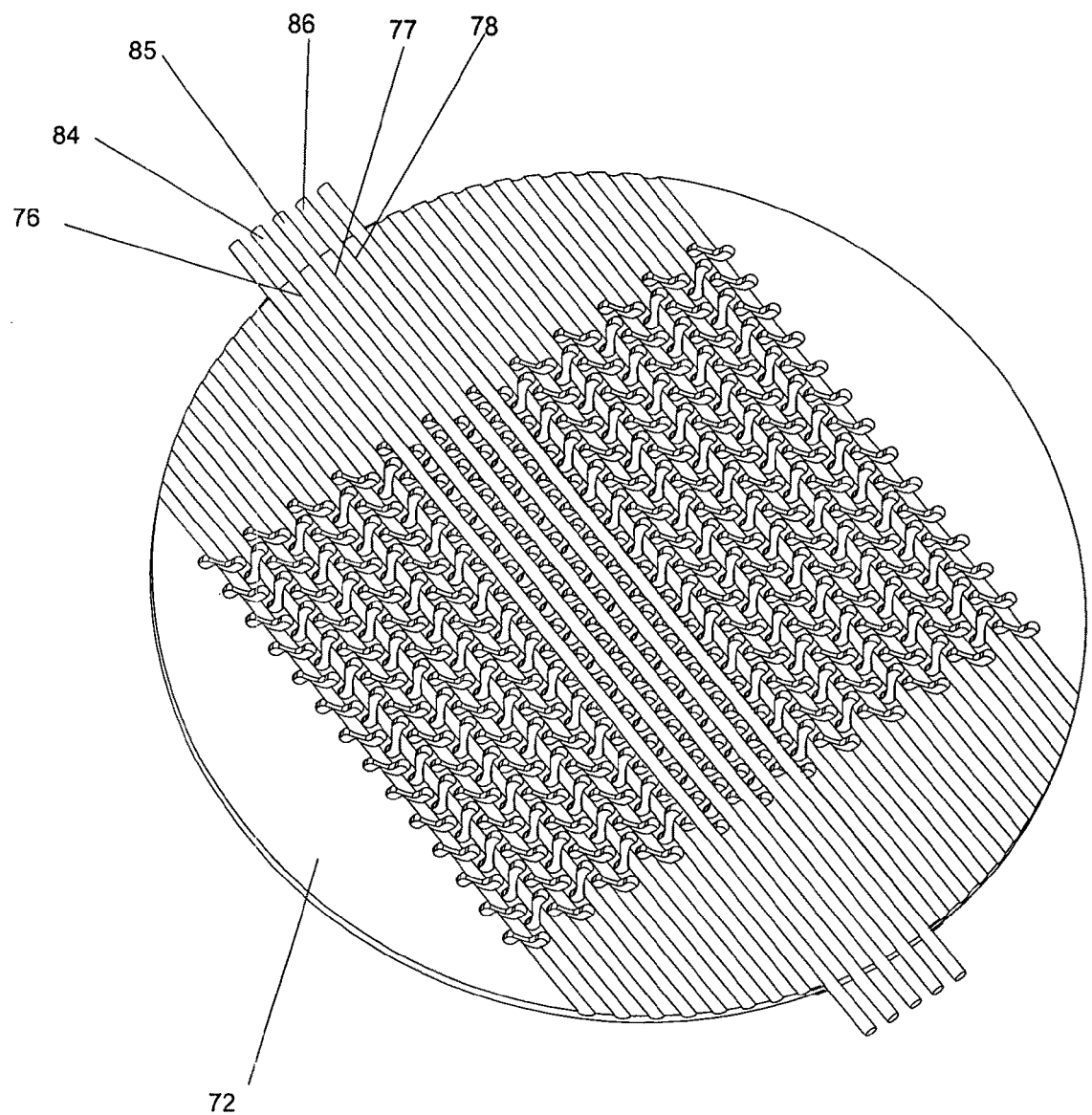
FIG. 15 shows an oblique view of parallel barrier strips or wires lying in parallel cavities of a mold plate containing disjoint element groups from one side of a contact surface.

Each of the separator grooves, exemplified by 76, 77, 78, in FIG. 13, is inlaid with a separator, the group of separators being illustrated in FIG. 14 in an oblique view of their array. The separator elements are exemplified by 84, 85, and 86, which correspond to three individual separators. The separators, exemplified by 84, 85, 86, are illustrated inlaid in their respective grooves, exemplified by 76, 77, and 78, in an oblique view of the mold plate 72 in FIG. 15.

Figure 16:
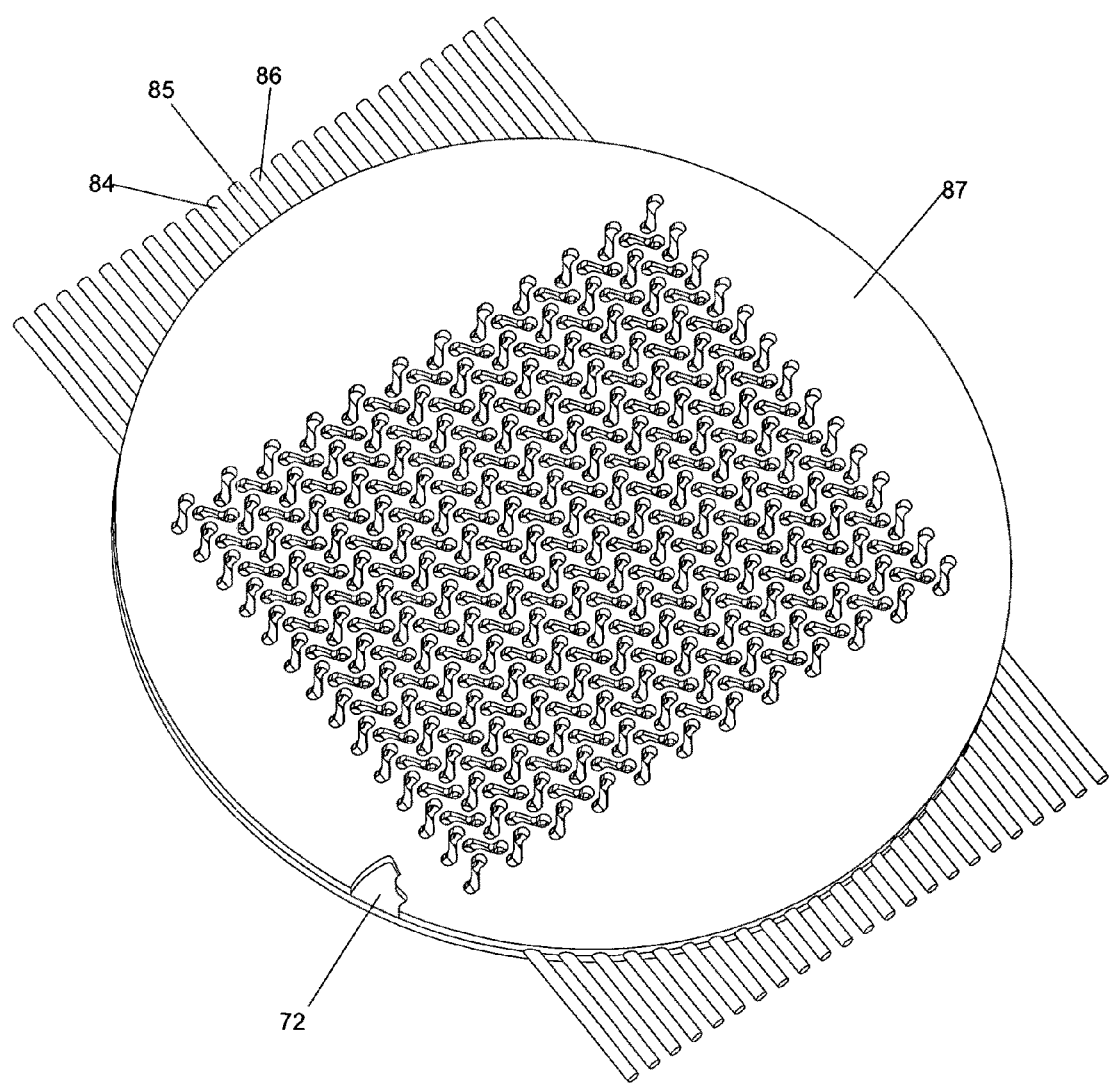
FIG. 16 shows an oblique view of an upper mold plate containing disjoint element group cavities juxtaposed over parallel barrier strips lying in parallel cavities in a lower mold plate containing opposing disjoint element group cavities.

In FIG. 16, the mold plate 87 containing the void volumes corresponding to the disjoint elements group from the opposite side of the contact surface is illustrated in an oblique view juxtaposed over, and in alignment with, the first mold plate 72 and the separators exemplified by 84, 85, and 86. The mold plate 87 may or may not have grooves corresponding to the grooves in mold plate 62, and it may or may not have a pattern of disjoint element voids similar to the disjoint element voids in mold plate 62. However, in any instance where the area of overlap of a disjoint element from one side of the contact surface with an area of corresponding overlap and thus intersection of an element of the other side of the contact surface is desired not to bond together, a separator must be present and encompassing of that overlapped area.

Similarly, in any instance where the area of contact surface penetration of a disjoint element from one side of the contact surface with an area of corresponding contact surface penetration of an element of the other side of the contact surface is desired to bond together, those two areas will face each other in substantial alignment and will be in fluid communication with each other when the mold plates 87, 72 are brought into facing contact and their voids are filled with thread material in liquid form, liquid here and hereinafter having the same meaning as described supra.

Figure 17:
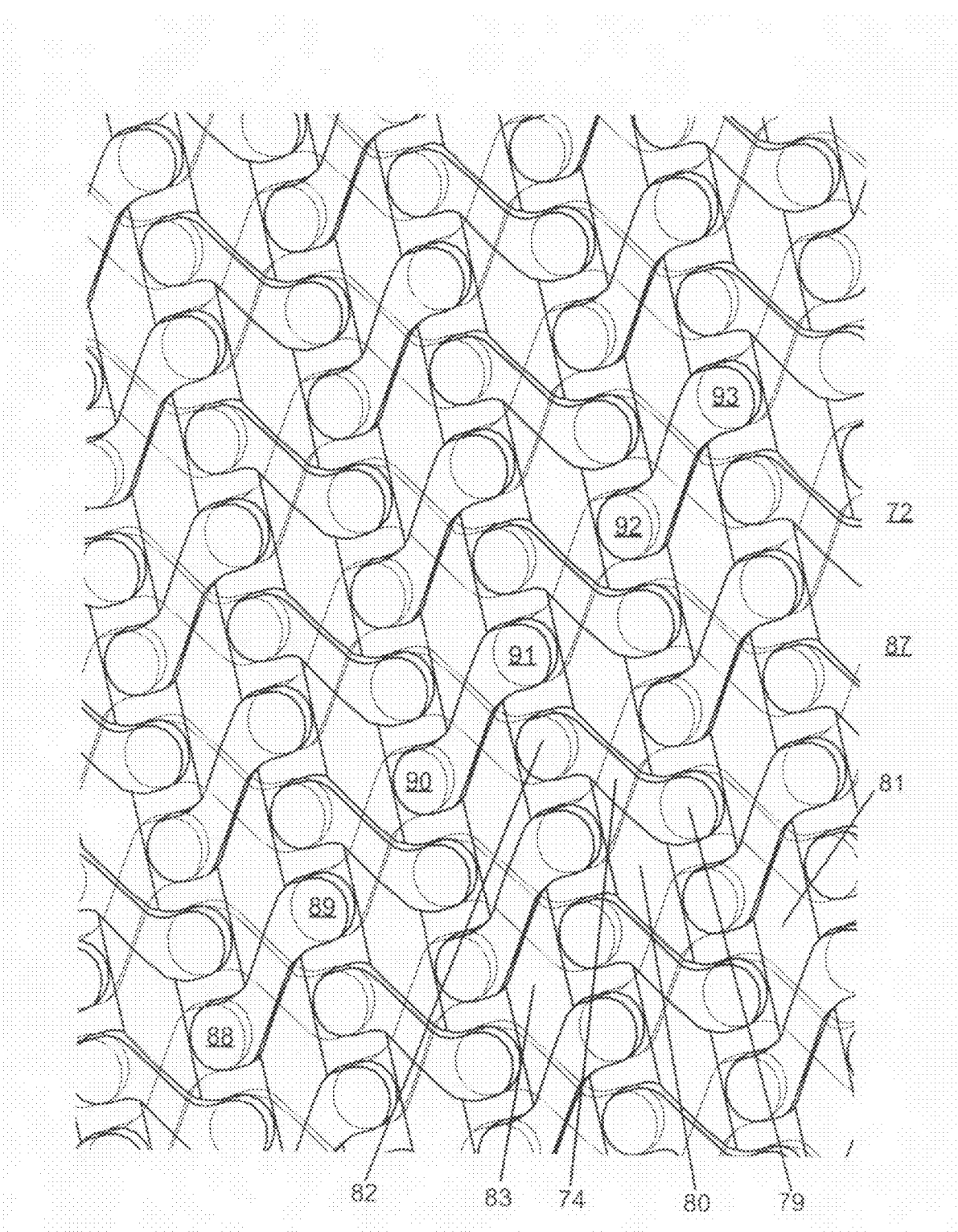
FIG. 17 shows an oblique view of opposing transparent mold cavities illustrating the juxtaposition of contact surface penetration areas of disjoint elements as well as overlapping intersections of opposing disjoint element groups.

FIG. 17 is an illustrative close-up detail of the alignment and juxtaposition of the exemplary patterns of disjoint element group voids in mold plates 72 and 87 and separator grooves exemplified by 80, 81, and 83. In this FIG. 17 illustration, the mold plate 87 has been made semi-transparent in order that the features of the mold plate 72 and the separator grooves 80, 81, 83 be not only visible, but visible in relation to the features of the mold plate 87, especially the disjoint element group voids.

In the illustration of FIG. 17, the overlapped areas of the disjoint element voids exemplified by 74 can clearly be seen, encompassed within the boundaries of the separator grooves, here exemplified by separator groove 80.

Similarly, the aligned areas of contact surface penetration can be seen, here exemplified by 79, 82, between the mold plates 72, 87, containing the disjoint element group voids.

It is useful to note here that the disjoint element voids in the mold plates 72, 87, though herein illustrated as voids that pass completely through the mold plates 72, 87, do not, for the purposes of this invention, have to be through openings. It will be evident to those practiced in the art that the through openings can serve as flow pathways for the efficacious filling of the voids with the liquid thread material, but it will be further evident that the filling pathways for the liquid thread material could be otherwise, such as along the continuous fluid communication pathway delineated along the areas of contact surface penetration 88, 89, 90, 91, 92, 93, for example, obviating the need for the voids in the mold plates 72, 87 to pass entirely through the plates. It lies in the prior art of mold design and mold filling to decide the flow paths of liquid thread material during the filling of the disjoint element voids in the mold plates.

Figure 18:
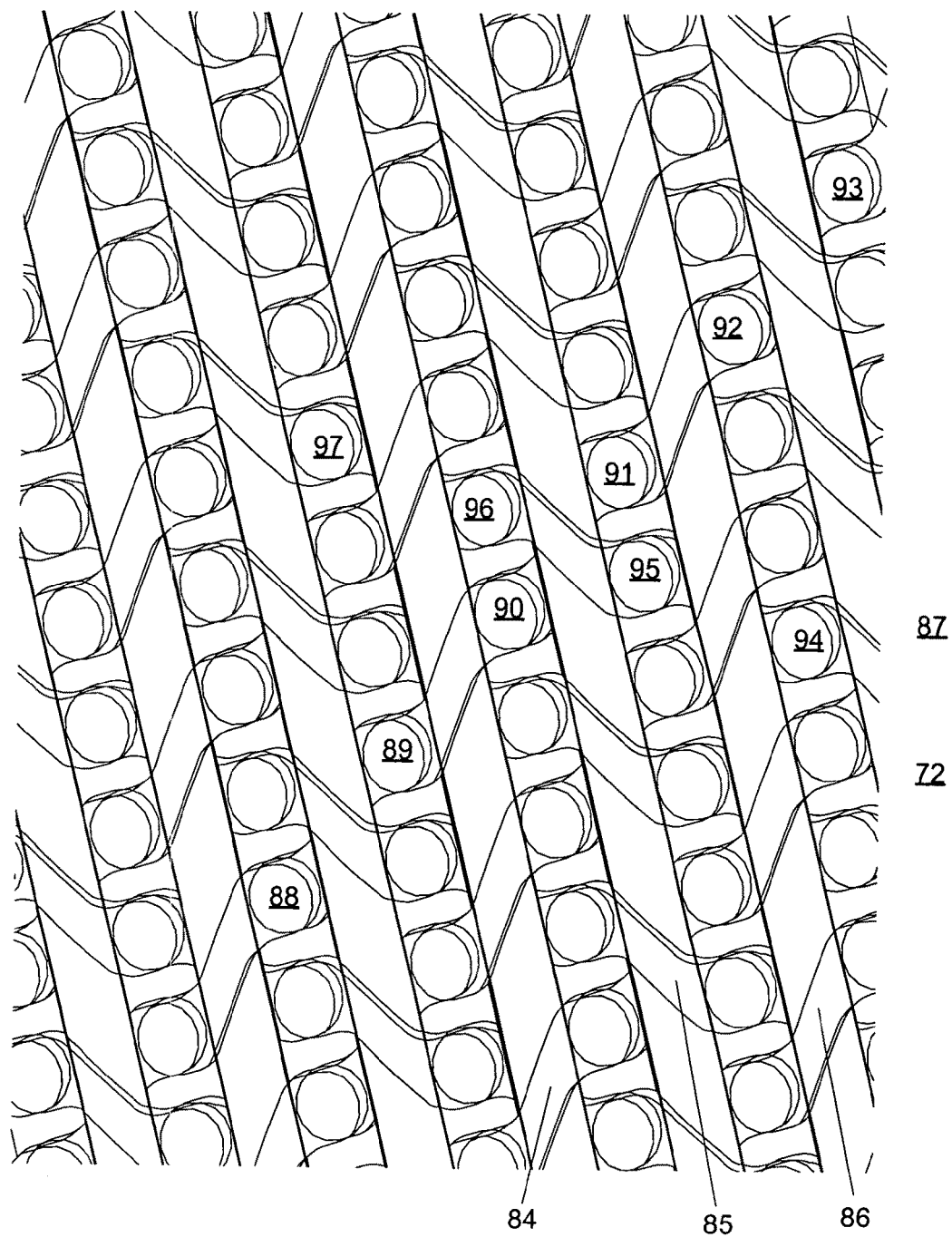
FIG. 18 shows an oblique view of opposing transparent mold cavities with barrier strips in situ, illustrating the juxta-position of barrier strips with overlapping intersections of opposing disjoint element groups.

FIG. 18 is the same view as FIG. 17, except that the separators 84, 85, 86 are shown in their respective separator grooves between the mold plates 72, 87. Here it can be seen that the separators prevent fluid communication between contiguous overlapping chains of disjoint element voids, here exemplified by the overlapping intersection of the pathways delineated along the areas of contact surface penetration 88, 89, 90, 91, 92, 93 with the areas of contact surface penetration 94, 95, 96, 96, specifically at the intersection lying between areas 90, 91 and areas 95, 96, and separated by separator 85.

Figure 19:
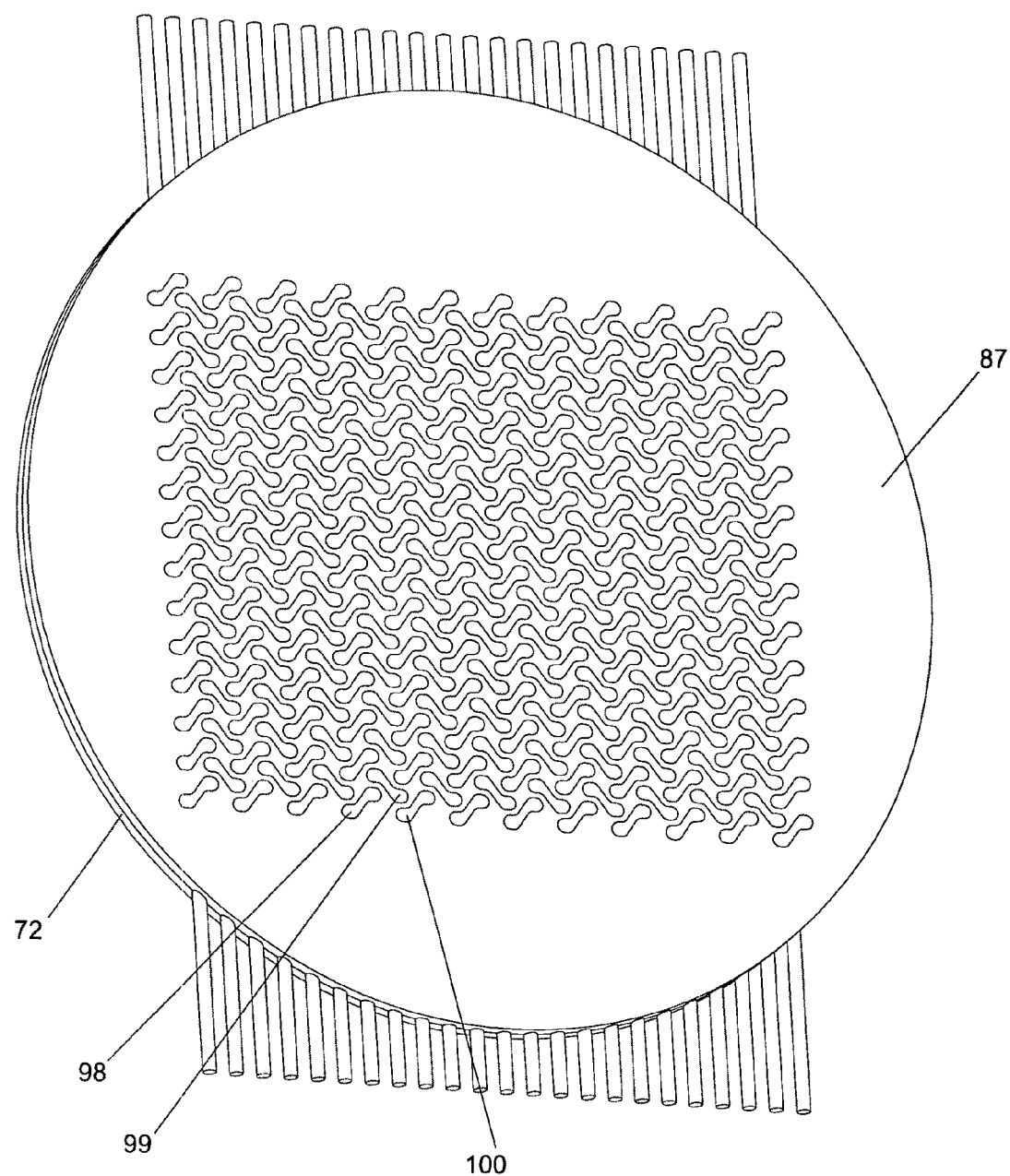
FIG. 19 shows an oblique view of the mold assembly of FIG. 16 with the disjoint element cavities filled with thread material.

FIG. 19 is the same illustration as FIG. 16, except that the disjoint element voids in the mold plates 72, 87 are shown filled with thread material, the filled voids here exemplified by 98, 99, 100. It is to be understood that the voids of the mold plates could be filled in each mold plate 72, 87 separately, the plates then being brought into communicating juxtaposition as described supra, or, in the preferred embodiment, the voids of both mold plates (or more, in the instances of multiple contact surfaces), the mold plates having been brought together, can be filled simultaneously, so that the areas of contact surface penetration are in simultaneous fluid communication during the solidification of the thread material and as a consequence, joints bonding the contact surface penetration areas are not necessary.

In FIG. 20, the view is again the same as the view in FIG. 16, except that the mold plate 87 has been lifted away from the solidified and conjoined disjoint element groups, exemplified by disjoint elements 98, 99, and 100. The separators are still present as exemplified by 84, 85, 86.

Figure 20:
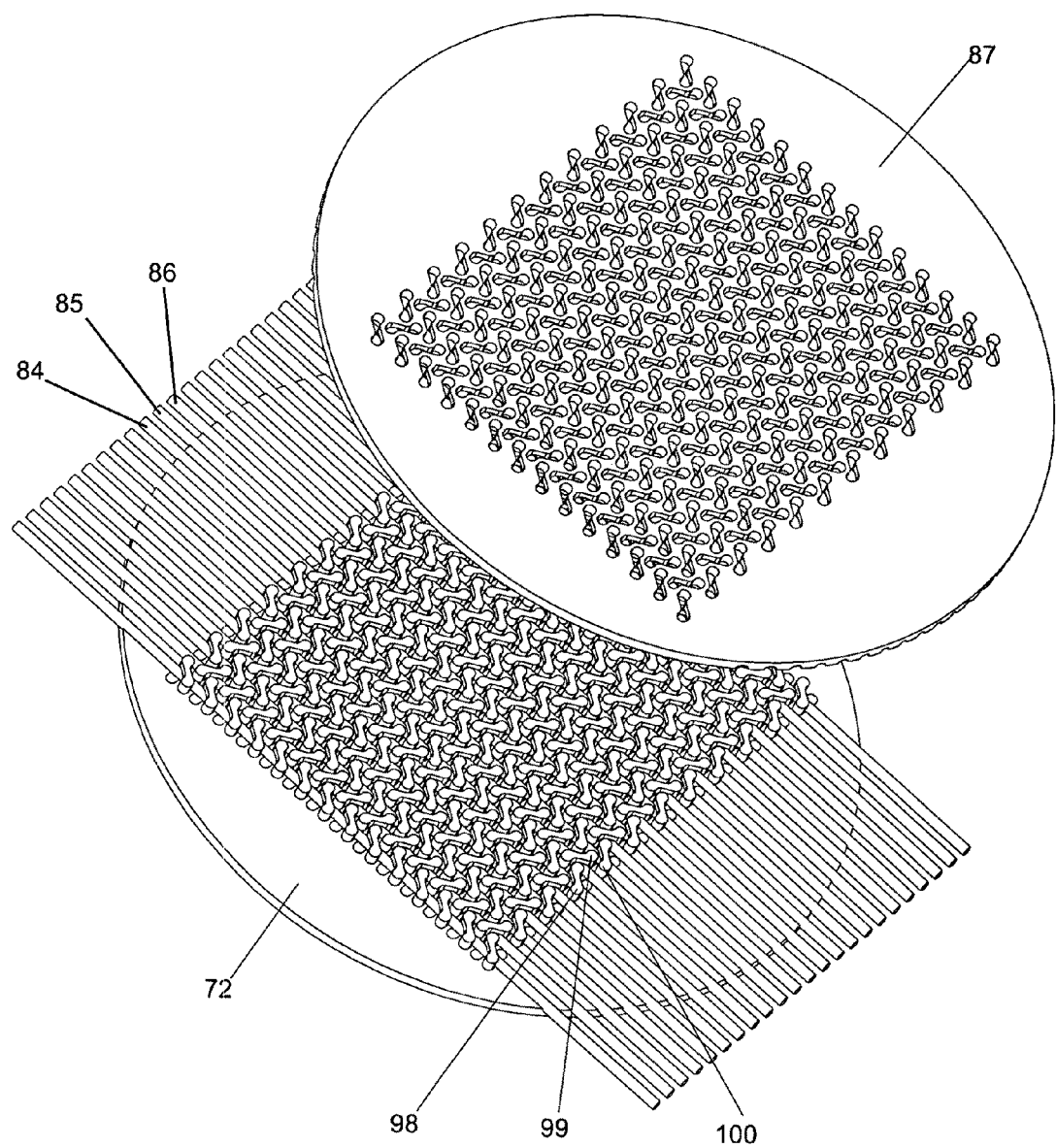
FIG. 20 shows an oblique view of mold assembly of FIG. 19 with top mold plate removed to illustrate formed disjoint element group threads.
Figure 21:
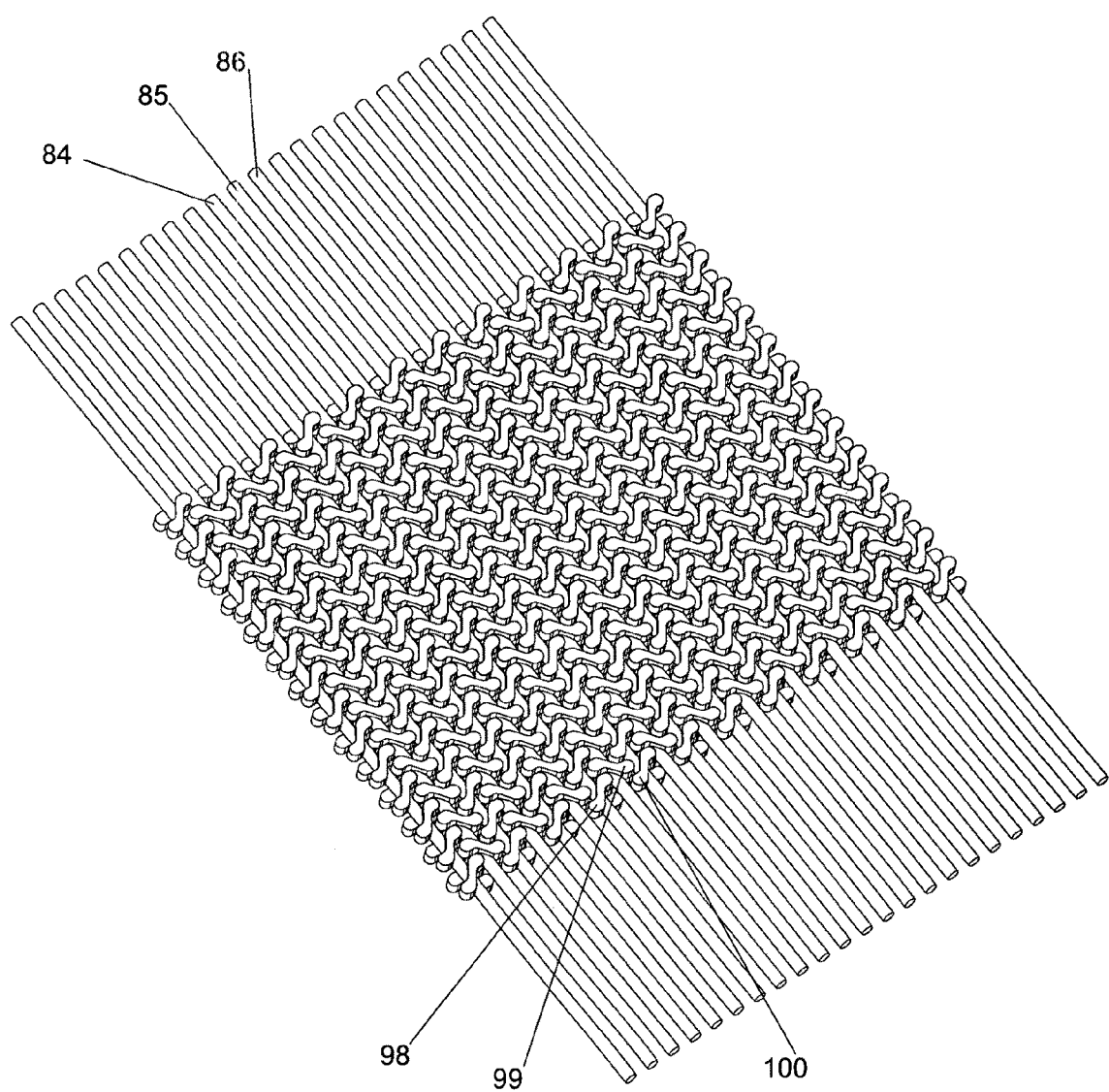
FIG. 21 shows an oblique view of mold assembly of FIG. 19 with bottom mold plate removed to illustrate formed disjoint element groups.

In FIG. 21, the view is the same oblique view as in FIG. 20, except that the mold plates 72, 87 have been removed entirely, leaving only the separators enmeshed in the solidified, conjoined disjoint element groups. The separators exemplified by 84, 85, 86, are removed by lengthwise, axial withdrawal, fracture, dissolution, melting, combustion, or whatever other process efficaciously removes the separator material and leaves behind the thread material. It may be desirable for the intended purposes of the molded fabric even to leave the separators in place. The separators may be of themselves part of the intended purpose of the molded fabric, and as such may be of many different materials and interactions with the thread material. This is discussed in more detail infra.

Figure 22:
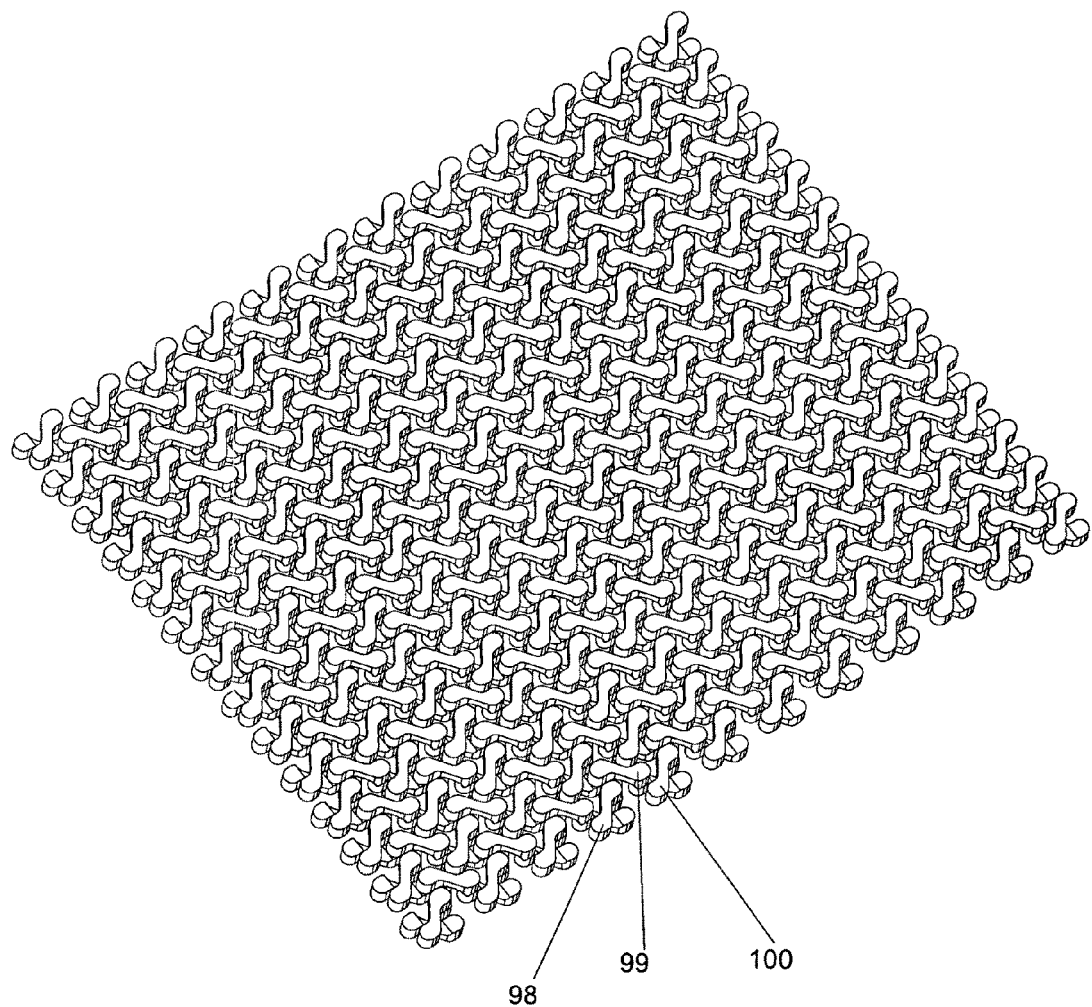
FIG. 22 shows an oblique view of the formed disjoint element groups from the mold of FIG. 19 with the barrier strips removed.

In FIG. 22, an oblique view of the solidified, conjoined disjoint element groups, here and hereinafter referred to as the molded fabric, is illustrated without the mold plates and separators. Some elements of the original disjoint element groups are exemplified by 98, 99, and 100.

Figure 23:
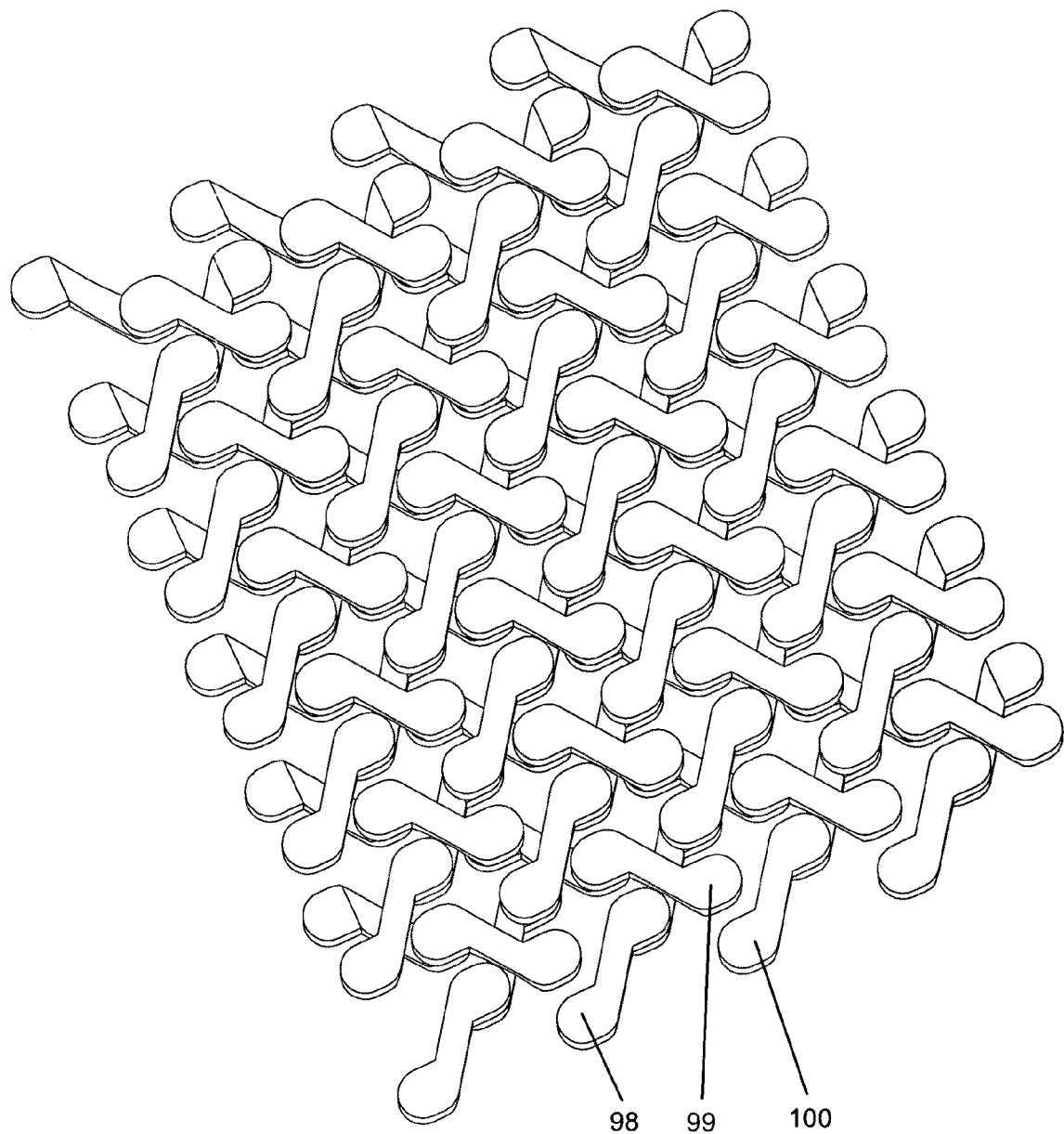
FIG. 23 shows an oblique view of a detail of the molded fabric from the mold of FIG. 19.

FIG. 23 is an oblique close view of the molded fabric structure. The solidified conjoined disjoint elements formed within the voids of one mold plate are conjoined in a woven pattern with the solidified conjoined disjoint elements formed within the voids of the other mold plate. Some elements of the original disjoint element groups are exemplified by 98, 99, and 100.

Figure 24:
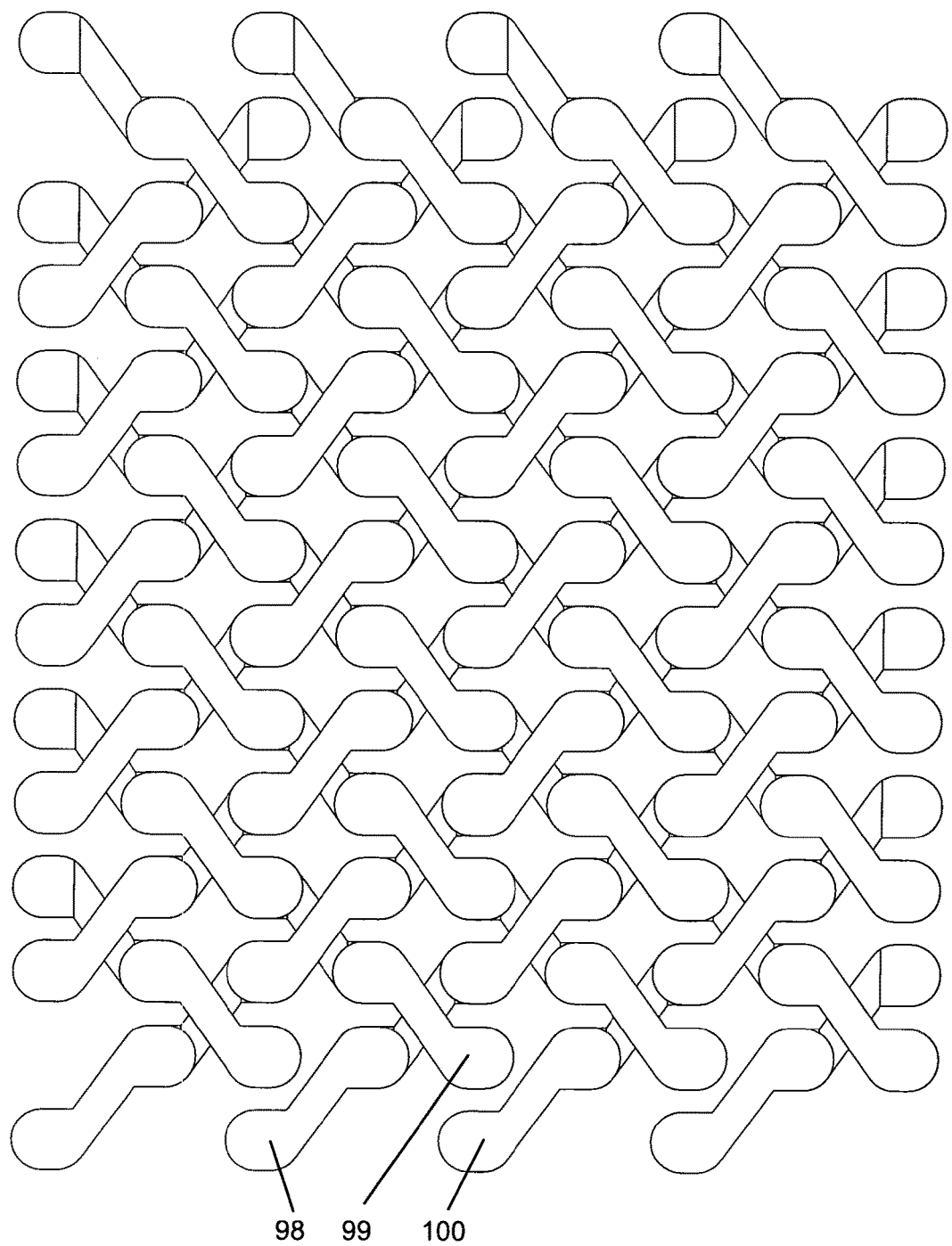
FIG. 24 shows a plan view of a detail of the molded fabric from the mold of FIG. 19.

FIG. 24 is a plan view normal to the surface of the molded fabric. Some elements of the original disjoint element groups are exemplified by 98, 99, and 100.

Figure 25:
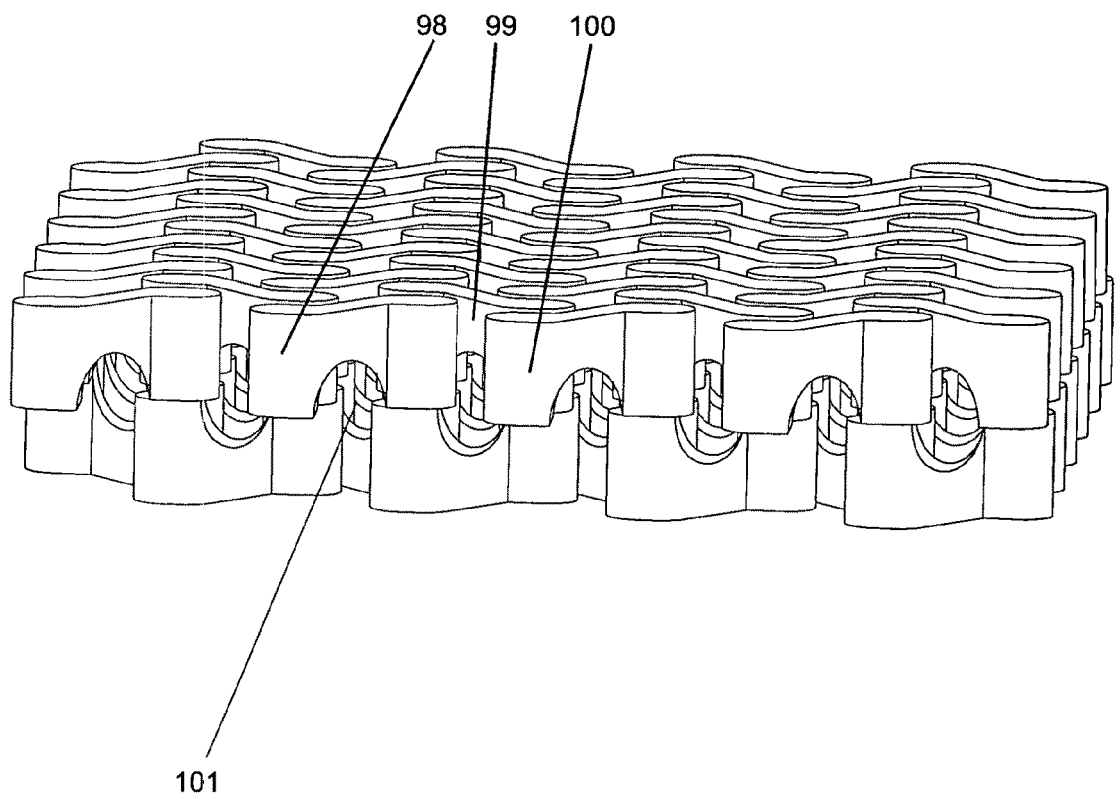
FIG. 25 shows an oblique view of the edge of the molded fabric from the mold of FIG. 19 illustrating the separation of opposing disjoint element overlapping intersections by the interposition of barrier strips.

FIG. 25 is an oblique view showing the aligned hole pattern 101 from which the separators are removed. The shape of the hole and the complementary shape of the separator can take on many forms in order to impart different mechanical function and flexibility to the molded fabric.

In another preferred embodiment the corresponding, communicating voids of the mold plates, the mold plates having been brought together, can be filled simultaneously in a progressive fashion, so that the areas of contact surface penetration are in simultaneous fluid communication during the solidification of the thread material and as a consequence, joints bonding the contact surface penetration areas are not necessary.

Figure 26:
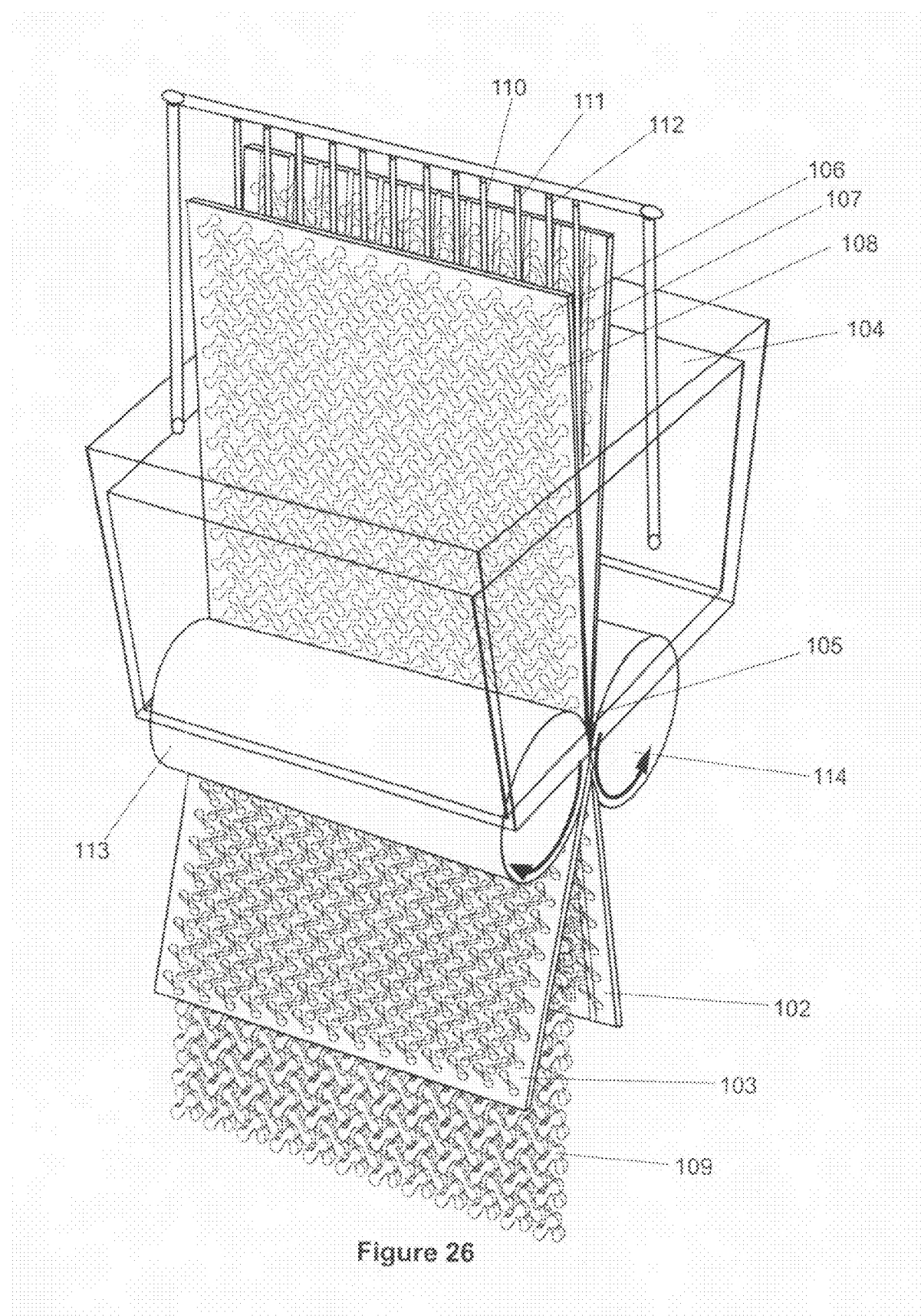
FIG. 26 shows an oblique view of a rotary molding system with stationary barrier strips and flexible belts containing opposing disjoint element group cavities passing through a rotary nip in a bath of thread material.

The filling of corresponding, communicating voids in the mold plates 72, 87 simultaneously and in a progressive fashion enables yet another preferred embodiment in which the mold plates 72, 87, are curved or flexible and pass through a nip between rotating rolls. This is shown pictorially in FIG. 26. The mold plates 102, 103, are immersed in liquid thread material 104 on the in-feeding side of the nip 105, such that the voids exemplified by 106, 107, 108 are entirely filled by immersion (or other means known in the art) with the liquid thread material, then come together in aligned and registered juxtaposition as they pass through the nip 105, whereupon the contents of the voids solidify shortly past the out-feeding side of the nip, whereupon the mold plates, following their curvilinear paths, separate and perhaps return to the liquid-thread-material-filled, in-feeding side of the nip 105. The molded and conjoined solidified disjoint element groups 109, formed in the voids of the mold plates, feed out of the out-feeding side of the nip in a continuous, molded fabric web as they pull free of the exiting mold plates 102, and 103.

The separators, exemplified by 110, 111, and 112, entrained between the mold plates in such a preferred rotary continuous molding method of fabrication, can be either moving or stationary. In the stationary instance, the separators exemplified by 110, 111, and 112, are of fixed length and aligned perpendicular to the nip line between the rotating rolls 113, 114. Each of the separators exemplified by 110, 111, and 112, is fixed in space on the in-feeding side of the nip 105, and passes through the nip 105 and between the rotating rolls 113, 114 and is aligned with and lying within the separator grooves, if present, of the mold plates 102, 103, which grooves are continuously sliding along the lengths of the fixed separators exemplified by 110, 111, and 112, as the mold plates 102, 103 are drawn between the nip 105, filled with liquid thread material 104. The lengths of the separators are so configured as to separate the overlapping areas of the disjoint elements until the liquid thread material 104 has solidified sufficiently within the voids e.g.: 106, 107, 108, that bonding between the overlapped areas will no longer occur. At this point, the out-feeding motion of the molded and conjoined solidified disjoint element groups 109 will pull the conjoined disjoint elements away from, and off of, the ends of the fixed separators, e.g.: 110, 111, and 112. The fixed separators e.g.: 110, 111, and 112, will remain fixedly in place between the rotating rolls.

In the moving instance, the separators are themselves fabricated in lengths commensurate to the length of molded fabric being manufactured, and are fed into the in-feeding side of the rotating roll nip along with and possibly at the same rate as the mold plates. The material of the separators can be of many purposeful compositions, whose purpose is either to bond with the disjoint elements, bond only partially with the disjoint elements, or not bond at all with the disjoint elements, such that the solidifying web emerging from the out-feeding side of the rotating roll nip and containing in this instance not only the conjoined disjoint element groups formed within the voids of the mold plates but also those simultaneously in-fed lengths of the separator material, might have distinctly different mechanical characteristics of rigidity, flexibility, elasticity or any of many other desirable characteristics, depending on the choice of separator material.

The separator may be itself a composite of materials, or a blend of natural fibers and synthetic resins. It may similarly be of metal or plastic or any material conceivable, even a liquid, or a frozen liquid, or a dissoluble solid. The separator may have volatile content, chemically active agents, surface characteristics and material properties of a wide range of possibilities, including electrical conductivity, optical properties and the like. It is not intended that this is a complete or comprehensive list, but only an indication of some possibilities. Similarly, the material of the thread itself may have a wide range of material characteristics and mechanical properties.

The voids in the mold plates, instead of being separate from the rotating rolls and nipped between them, can alternatively be pockets in the surfaces of the rolls, as described in an earlier preferred embodiment (such as the voids illustrated by 54 and 56 in FIG. 9, and shown on rolls 61, 62, 63, 64 in FIG. 12). The separator grooves would then be in either one or both of the surfaces of the rolls running more or less circumferentially.

In all of the foregoing embodiments, it must be stressed that the weave pattern, planarity, and number of contact surfaces present are not implied to be only as exemplified in the drawings. Any number of weave patterns, contact surfaces, and contours can be accomplished using inventive methods described herein. The possible benefits advantages and functionalities enabled by this new method of molding fabric are rooted in the enabling invention. Only exemplary instances of possible fabric functionalities have been suggested.

As mentioned at the end of the Background section above, applicant's printed or laminated embodiments, such as those laminating patterns of punched out disjoint elements, are to be included under the term "molded" as used by applicant in its broader sense as to shape or form as permitted by the unabridged dictionary.

I claim:

1. A method of forming a fabric having a given thickness and having first and second groups of overlapping threads joined together comprising:
   (a) providing a first group of numerous discrete disjoint elements positioned on a first side of a contact boundary extending throughout the thickness of said fabric being formed;
   (b) providing a second group of numerous discrete disjoint elements positioned on a second side of said contact boundary, opposite said first side; and
   (c) joining together said numerous discrete disjoint elements at areas of contact of said first and second groups of disjoint elements at said contact boundary and not at over-lapping and under-lapping crossings of portions of said first and second groups of disjoint elements away from said areas of contact at said contact boundary wherein step (c) includes introducing separator elements for preventing joining together of said discrete disjoint elements at over-lapping and under-lapping crossings of portions of said first and second groups of disjoint elements away from said areas of contact at said contact boundary.

2. The method of claim 1 wherein said separator elements comprise a physical barrier positioned between said first and second groups of discrete disjoint elements at positions away from said areas of contact at said contact boundary.

3. The method of claim 2 wherein said physical barrier comprises an apertured film having apertures at said areas of contact where joining together of said groups of first and second discrete disjoint elements shall occur.

4. The method of claim 2 wherein said physical barrier comprises a set of elongated separator elements interleaved between said first and second groups of discrete disjoint elements.

5. The method of claim 1 wherein said separator elements comprise printed, painted, or sprayed patterns of anti-bonding agents.

6. The method of claim 2 including the step of removing said physical barrier from a batch of fabric after termination of molding.

7. The method of claim 1 wherein lengths of discrete disjoint elements in rows of said first group are positioned transversely with respect to lengths of disjoint elements in aligned facing rows of said second group.

8. The method of claim 7 wherein the lengths of discrete disjoint elements in rows of said first group are positioned at substantially right angles with respect to the lengths of disjoint elements in aligned facing rows of said second group.

9. A method of forming a fabric having a given thickness and having first and second groups of overlapping threads joined together comprising:
   (a) providing a first patterned group of numerous discrete disjoint elements on a first mold surface positioned on a first side of a contact boundary extending throughout the thickness of said fabric being molded;
   (b) providing a second patterned group of numerous discrete disjoint elements, over-lapping said first group of discrete disjoint elements, on a second mold surface on a second side of said contact boundary, opposite said first side;
   (c) bringing said first and second mold surfaces together; and (d) joining together said discrete disjoint elements of said first and second groups of discrete disjoint elements at areas of contact of end portions of said first and second groups of discrete disjoint elements at said contact boundary and not at over-lapping and under-lapping crossings of portions of said first and second groups of disjoint elements away from said areas of contact at said contact boundary.

10. The method of claim 9 wherein the first and second groups of numerous discrete disjoint elements are cast from melt or solution contained within pockets formed within said first and second mold surfaces.

11. The method of claim 9 wherein the first and second groups of numerous discrete disjoint elements comprise patterned arrays of individual pieces supported upon said first and second mold surfaces.

12. The method of claim 11 wherein said patterned arrays of individual pieces are punched from sheet material.

13. The method of claim 9 wherein said first and second mold surfaces pass through a nip between rolls while joining together said first and second groups of discrete disjoint elements.

14. The method of claim 10 wherein said first and second mold surfaces pass through a nip between rolls while joining together said first and second groups of discrete disjoint elements.

15. The method of claim 11 wherein said first and second mold surfaces pass through a nip between rolls while joining together said first and second groups of discrete disjoint elements.

16. The method of claim 10 wherein said melt is produced by heating thermoplastic material enabling said material to flow across said areas of contact.

17. The method of claim 9 wherein said first and second mold surfaces are flat platens.

18. The method of claim 9 wherein said first and second mold surfaces are surfaces of cylindrical rolls.

19. The method of claim 9 wherein said first and second mold surfaces are surfaces of flexible webs.

20. The method of claim 19 wherein said flexible webs are passed through nips of a roller pair.

\* \* \* \* \*